US010920361B2

United States Patent
Zhao et al.

(10) Patent No.: US 10,920,361 B2
(45) Date of Patent: Feb. 16, 2021

(54) SUPPORT FOR HOUSEHOLD APPLIANCE, AND HOUSEHOLD APPLIANCE

(71) Applicants: QINGDAO HAIER WASHING MACHINE CO., LTD., Shandong (CN); QINGDAO HAIER SMART TECHNOLOGY R&D CO., LTD., Shandong (CN)

(72) Inventors: Zhiqiang Zhao, Shandong (CN); Sheng Xu, Shandong (CN)

(73) Assignees: QINGDAO HAIER WASHING MACHINE CO., LTD., Shandong (CN); QINGDAO HAIER SMART TECHNOLOGY R&D CO., LTD., Shandong (CN)

( * ) Notice: Subject to any disclaimer, the term of this patent is extended or adjusted under 35 U.S.C. 154(b) by 0 days.

(21) Appl. No.: 16/473,366

(22) PCT Filed: Jun. 29, 2017

(86) PCT No.: PCT/CN2017/090849
§ 371 (c)(1),
(2) Date: Jun. 25, 2019

(87) PCT Pub. No.: WO2018/141147
PCT Pub. Date: Aug. 9, 2018

(65) Prior Publication Data
US 2020/0141046 A1    May 7, 2020

(30) Foreign Application Priority Data
Jan. 16, 2017    (CN) .......................... 201710030053.1

(51) Int. Cl.
*D06F 39/12*      (2006.01)
*D06F 37/20*      (2006.01)
*F16F 15/023*    (2006.01)

(52) U.S. Cl.
CPC ............ *D06F 39/125* (2013.01); *D06F 37/20* (2013.01); *F16F 15/023* (2013.01)

(58) Field of Classification Search
CPC ...... D06F 39/125; D06F 37/20; F16F 15/023; F16F 15/0237; F16M 7/00
(Continued)

(56) References Cited

U.S. PATENT DOCUMENTS 2,635,838 A * 4/1953 Branson ................ F16F 15/023
                                                       248/562
2,705,118 A * 3/1955 Beck ....................... F16F 13/08
                                                       248/558

(Continued)

FOREIGN PATENT DOCUMENTS

CN         2866559 Y      2/2007
CN       202671894 U      1/2013
(Continued)

OTHER PUBLICATIONS

International Search Report (PCT/ISA/210) dated Sep. 29, 2017, by the State Intellectual Property Office of the P.R. China as the International Searching Authority for International Application No. PCT/CN2017/090849.
(Continued)

*Primary Examiner* — Muhammad Ijaz
(74) *Attorney, Agent, or Firm* — Buchanan Ingersoll & Rooney PC

(57) ABSTRACT

A control method for opening a door of a drum washing machine comprises the steps: S1, receiving a door opening instruction sent by a user; S2, judging whether a water level at a front end of a drum assembly satisfies a condition of opening the door, if yes, entering step S4, if no, entering step S3; S3, tilting the drum assembly with a tilting mechanism, and then returning to step S2; and S4, unlocking a door lock.

(Continued)

Through a manner of lifting a front end of the drum assembly, the operation of opening the door during running is realized. In this way, the original parts of the washing machine do not need to be changed, and the drum assembly is tilted only through a driving device arranged at a lower part of the drum assembly or through a hanging spring arranged at a top part of the drum assembly.

15 Claims, 13 Drawing Sheets

(58) Field of Classification Search
USPC .................. 248/188.2, 188.3, 562, 570, 615
See application file for complete search history.

(56) References Cited

U.S. PATENT DOCUMENTS

| | | | | |
|---|---|---|---|---|
| 4,593,951 | A * | 6/1986 | Slaats | A47C 3/30 108/147 |
| 6,009,815 | A * | 1/2000 | Hartman | A47B 91/02 108/147 |
| 10,443,777 | B2 * | 10/2019 | Zhao | D06F 39/125 |
| 10,626,541 | B2 * | 4/2020 | Zhao | F16F 15/023 |
| 2012/0017645 | A1 | 1/2012 | Baron | |
| 2018/0187362 | A1 * | 7/2018 | Zhao | F16M 7/00 |
| 2018/0195227 | A1 * | 7/2018 | Zhao | F16F 9/065 |
| 2018/0202095 | A1 * | 7/2018 | Zhao | A47B 91/16 |
| 2019/0292712 | A1 * | 9/2019 | Zhao | A47B 91/16 |
| 2020/0173095 | A1 * | 6/2020 | Zhao | F16F 15/022 |
| 2020/0191320 | A1 * | 6/2020 | Zhao | D06F 39/125 |

FOREIGN PATENT DOCUMENTS

| | | |
|---|---|---|
| CN | 204005050 U | 12/2014 |
| CN | 104963160 A | 10/2015 |
| CN | 104975476 A | 10/2015 |
| CN | 105755750 A | 7/2016 |
| CN | 105755757 A | 7/2016 |
| CN | 105757408 A | 7/2016 |
| CN | 205775399 U | 12/2016 |

OTHER PUBLICATIONS

Written Opinion (PCT/ISA/237) dated Sep. 29, 2017, by the State Intellectual Property Office of the P.R. China as the International Searching Authority for International Application No. PCT/CN2017/090849.

* cited by examiner

SUPPORT FOR HOUSEHOLD APPLIANCE, AND HOUSEHOLD APPLIANCE

TECHNICAL FIELD

The present disclosure relates to a technical field of support leveling of household appliances, and specifically relates to a support for household appliance, and a household appliance.

BACKGROUND

Generally, leveling devices are arranged at bottoms of shells of the household appliances, the household appliances can achieve a stable placed state through regulating the leveling devices when the household appliances are placed, and the leveling devices can support the household appliances and keep the household appliances stable after the household appliances are placed in a leveled manner.

Taking a washing machine for example, bolt supports are generally mounted at the bottom of a shell or whole set of the existing washing machine, each bolt support comprises a lead screw, a nut gasket and a rubber pad. The nut gaskets can be screwed up and down on the lead screws, the lead screws can also be screwed up and down in screw holes of a bottom plate of the shell, and the height regulating of the washing machine is achieved through lengths of the lead screws of the bolt supports screwed in the screw holes of the bottom plate; for a majority of washing machines, heights are increased through counterclockwise rotation of the supports, the heights are reduced through clockwise rotation of the supports; and after the heights of the bolt supports are regulated, the nut gaskets for preventing loosening are screwed down to keep steadiness.

For the supports of the washing machine, although the leveling of the washing machine is achieved, users are required to carry out manual regulation, and user operation is extremely inconvenient if the dead weight of the washing machine is relatively heavy or a setting space is narrow and small. In addition, during the long-term working of the washing machine, vibration also acts on the leveling supports, the supporting failure of the leveling supports is easily caused, and thus, the out-of-flat placement of the washing machine is caused.

For example, the existing 8 KG drum washing machine is generally about 80 Kg and is relatively heavy, the regulation by customers is extremely inconvenient, the condition that the washing machine is regulated to an optimum state cannot be guaranteed even if the regulation is completed. During the washing, particularly spin-drying dewatering of acceleration to 1400 r/min from 0 r/min of the washing machine, great vibration will be caused once the washing machine is not horizontal or suffers from a failure support problem, and thus, the comfort of use of the customers is greatly affected.

In addition, the vibration caused by the out-of-flat of the washing machine may loosen screws of the supports, supporting brackets of the supports may vertically move, a horizontal state of the washing machine may be changed by the instability, and vibration that is more intensive is caused. Due to the vicious cycle, the noise of the washing machine will become louder and louder in long-time use, certain damage to the washing machine is caused, and the service life of the washing machine is shortened.

Therefore, the leveling of the existing washing machines has the problems of manual regulation, time and labor consuming and relatively poor accuracy.

Taking this into consideration, the present disclosure is provided.

SUMMARY

In order to solve the above problems, a first object of the present disclosure is to provide a support for household appliance, and concretely, a technical scheme as follows is adopted.

A support for a household appliance comprises a hydraulic plate;

a sheath, which is fixedly connected with the hydraulic plate;

a regulating support, which is arranged in the sheath and is axially movable relative to the sheath;

an accommodation chamber, which is formed by the hydraulic plate, the sheath and the regulating support;

a flexible accommodation body, which accommodates a liquid medium and is arranged in the accommodation chamber;

the flexible accommodation body extends and retracts to drive the regulating support to axially move in the sheath for leveling under action of pressure; and a fixing member for sealingly mounting the flexible accommodation body on the hydraulic plate and a protecting member for protecting the flexible accommodation body, the fixing member or the protecting member is embedded in the protecting member or the fixing member.

Further, one end of the protecting member is provided with a protecting curved surface, and the protecting curved surface is matched with an outer surface of the flexible accommodation body to prevent the flexible accommodation body from being damaged by pressure. The other end of the protecting member is provided with an insertion groove, and the fixing member is embedded in the insertion groove of the protecting member.

Further, the fixing member and/or the protecting member are/is provided with a limiting mechanism for limiting the circumferential rotation of the protecting member relative to the fixing member.

Further, a limiting protrusion is provided on an inner wall of the insertion groove of the protecting member, and a limiting recess cooperating with the limiting protrusion is provided on the fixing member.

Further, the flexible accommodation body comprises an opening part and a retractable accommodating body; the opening part is sealingly mounted to the hydraulic plate by the fixing member; the protecting member is arranged between the accommodating body and the fixing member; the fixing member is embedded into the protecting member; and the protecting member is provided with the protecting curved surface matching with the accommodating body.

Further, the fixing member is a pressing ring, and the pressing ring includes an annular body. The inside of the annular body has a pressing ring opening. The opening part of the flexible accommodation body passes through the pressing ring opening and is sealingly mounted to the hydraulic plate by the annular body. The protecting member comprises a protecting ring, and a protecting ring opening for allowing the opening part to pass through is provided inside the protecting ring. The insertion groove for allowing the pressing ring to be inserted is provided in one end, closing to the pressing ring, of the protecting ring. The protecting curved surface is provided on one end, in touch with the flexible accommodation body, of the protecting ring.

Further, the internal wall of the insertion groove of the protecting ring is provided with at least one limiting protrusion, and an outer peripheral wall of the pressing ring is provided with the limiting recess corresponding to the limiting protrusion.

Preferably, a plurality of limiting protrusions are provided, which are respectively distributed along the circumferential direction of the inner wall of the insertion groove. A plurality of limiting recesses are provided, which are correspondingly distributed on the outer peripheral wall of the pressing ring.

Further, the limiting protrusion has an arc-shaped limiting outer convex surface, and the limiting recess has an arc-shaped limiting inner concave surface, and the limiting outer convex surface and the limiting inner concave surface cooperate with each other.

Further, the flexible accommodation body comprises a small-diameter part communicating with the accommodating body; and an inner diameter of the small-diameter part is smaller than an inner diameter of the accommodating body. The end part of the small-diameter part is flanged to form the opening part. The fixing member sleeves on the small-diameter part to sealingly mount the opening part to the hydraulic plate. The protecting member sleeves on the small-diameter part and is located between the accommodating body and the fixing member.

A second object of the present disclosure is to provide a household appliance with the support for household appliance according to any one of the above-mentioned items.

According to the support for household appliance, provided by the disclosure, based on the hydraulic principle, the support can perform adaptive regulation automatically by means of the fluidity of the hydraulic medium under different pressures resulting from unflatness, and the hydraulic medium stops circulating until for household appliance achieves balance by the support. Thus, automatic leveling is achieved.

The support for household appliance of the present disclosure comprises a fixing member and a protecting member, the fixing member or the protecting member is embedded in the protecting member or the fixing member which brings the following technical effects.

1. One of the fixing members and the protecting members of the present disclosure are embedded and installed in the other one, which can play a limit function, avoid setting a complicated limit structure, and is simple and stable.

2. The protecting member and the flexible accommodation body of the present disclosure are closely in contact with each other with no gaps in between. The expansion rupture of the accommodation body is avoided when the support for the household appliance is under great impact pressure (e.g. when the household appliance or any object with the support for the household appliance installed is dropped or lifted or suddenly placed), the reliability is improved.

3. One of the fixing members and the protecting members are embedded and installed in the other one, so the installation heights of the fixing member and the protecting member are decreased, further the whole height of the support for household appliance is decreased. When the support for household appliance is mounted on the household appliance, it has less influence on the overall center of gravity, which is more conductive to the support stability of the household appliance, and has better shock absorption effect on the vibration during the working process of the household appliance (such as the dehydration vibration of the washing machine).

According to the household appliance provided by the present disclosure, by adopting the support for household appliance, automatic leveling is achieved, the mounting is simple and convenient, and the overall vibration and noise of the household appliance are lowered.

Figure 1:
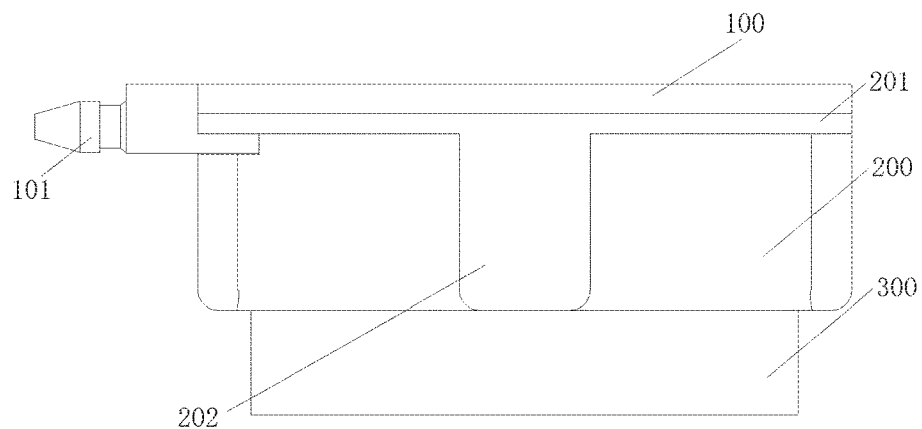
FIG. 1 is a front view of a support for household appliance of embodiment I of the present disclosure.
Figure 2:
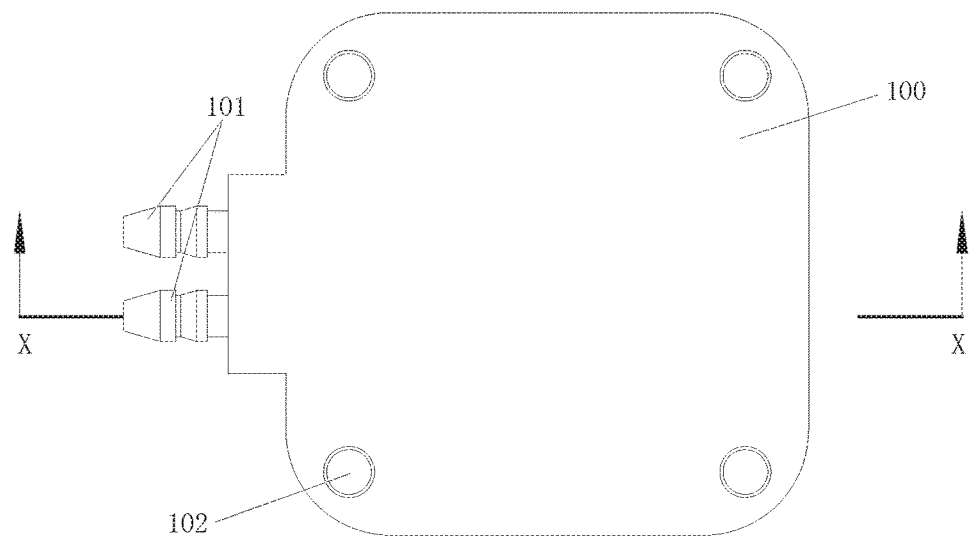
FIG. 2 is a top view of the support for household appliance of embodiment I of the present disclosure.
Figure 3:
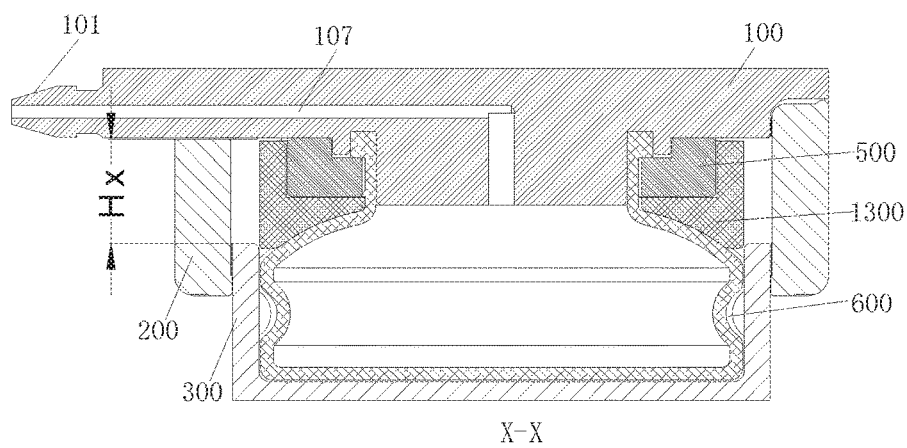
FIG. 3 is a sectional view of the support for household appliance of embodiment I of the present disclosure along a plane X-X in the FIG. 2.
Figure 4:
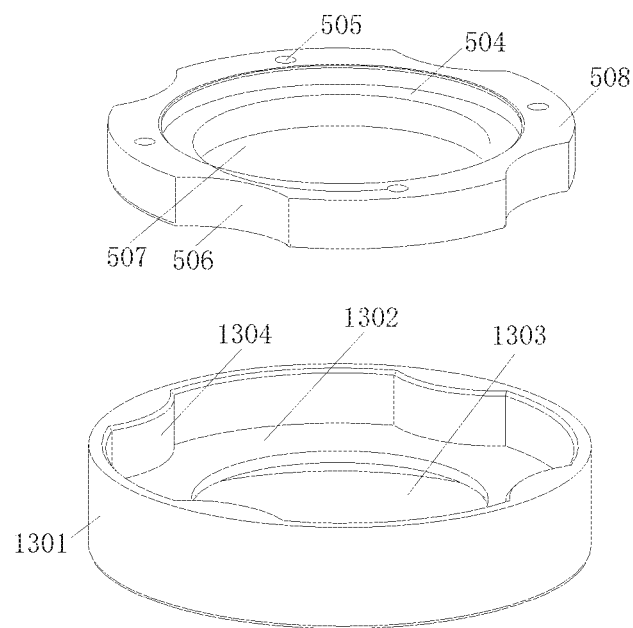
FIG. 4 a local exploded top view of the support for household appliance of embodiment I of the present disclosure.
Figure 5:
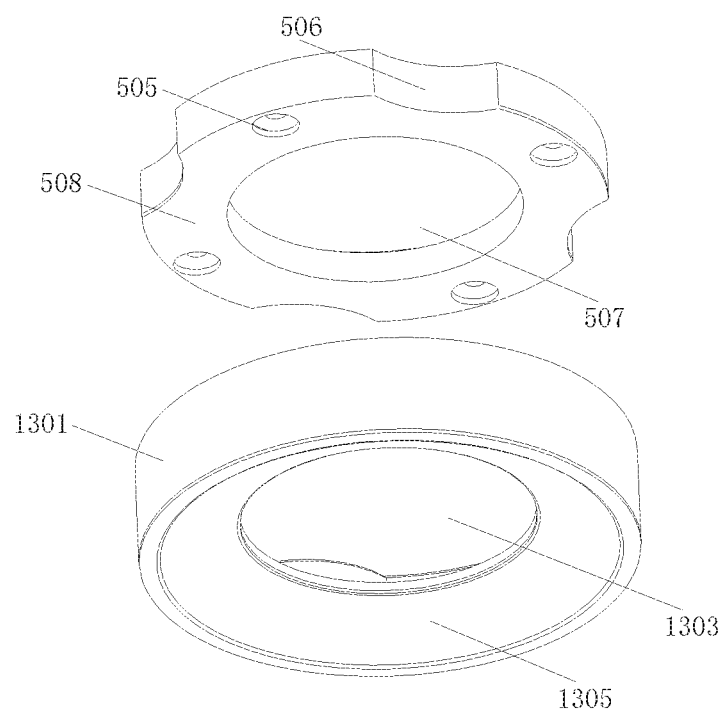
FIG. 5 is a local exploded upward view of the support for household appliance of embodiment I of the present disclosure.
Figure 6:
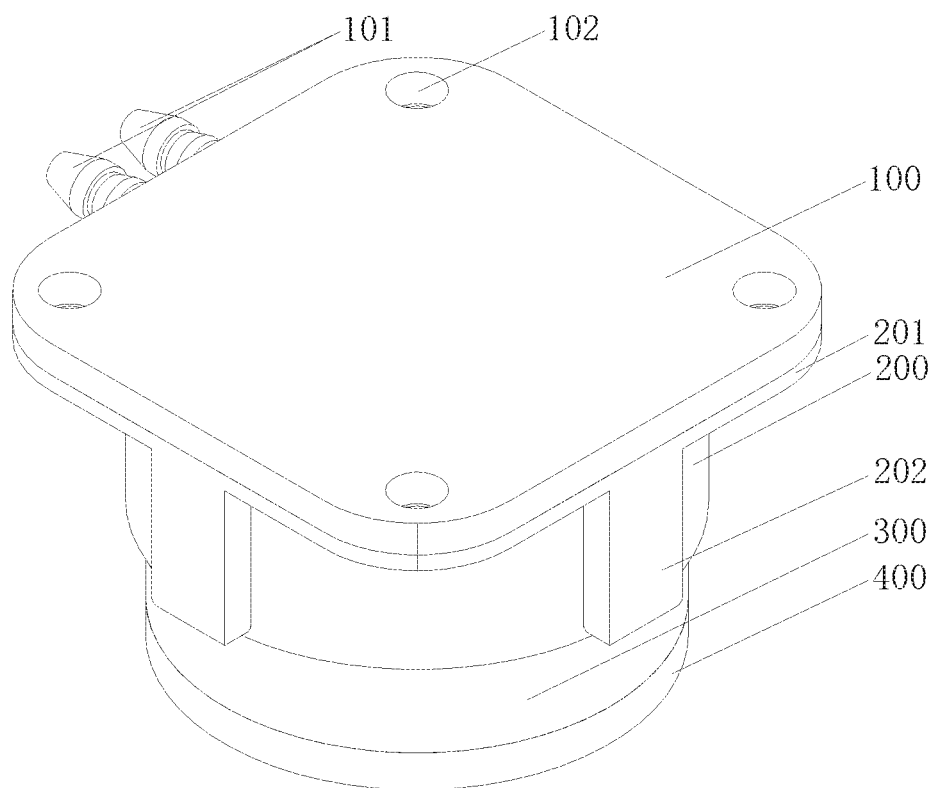
FIG. 6 is a three-dimensional structural top view of a support for household appliance of embodiment II of the present disclosure.
Figure 7:
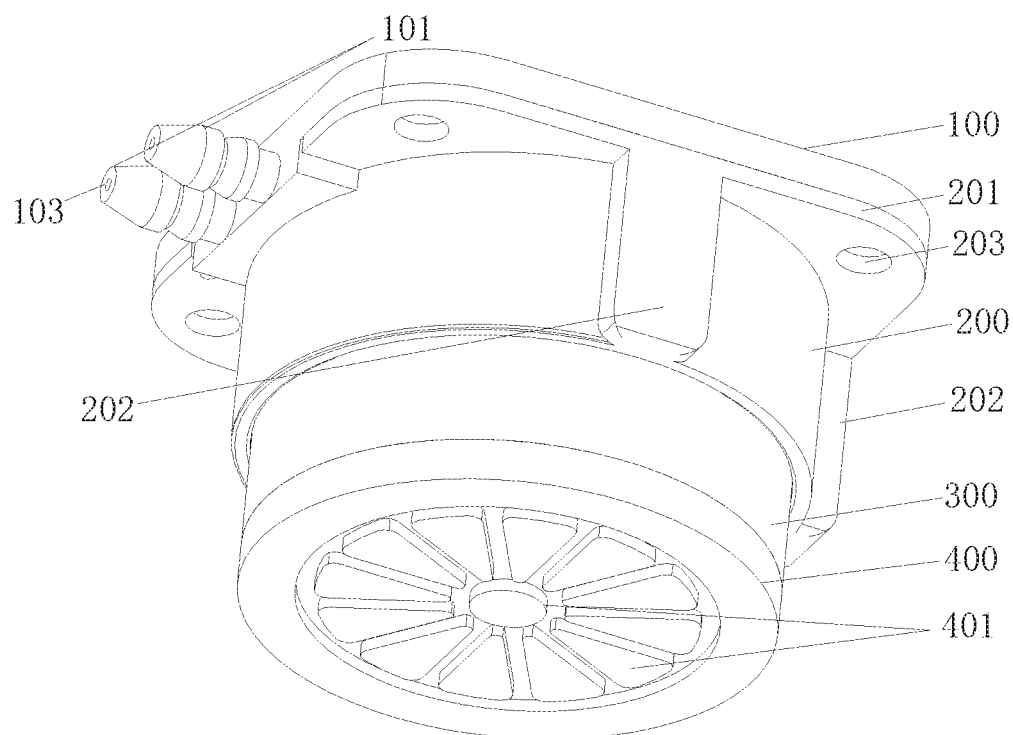
FIG. 7 is a three-dimensional structural upward view of a support for household appliance of embodiment II of the present disclosure.

Reference Signs: 100—hydraulic plate, 101—liquid outlet nozzle, 102—hydraulic plate hole, 200—sheath, 103—liquid hole, 104—hydraulic plate groove, 105—annular bulge, 106—second embedding part, 107—liquid flow passage, 108—first embedding part, 109—base part, 110—passage, 201—mounting plane, 202—guiding limiting groove, 203—sheath hole, 204—sheath projecting part, 207—second guiding limiting groove, 208—first guiding limiting groove, 209—stopping part, 300—regulating support, 301—guiding limiting convex portion, 302—first guiding limiting block, 303—second guiding limiting block, 400—rubber gasket, 401—pattern, 500—pressing ring, 501—radial projecting part, 502—axial projecting part, 503—pressing ring groove, 504—annular groove, 505—pressing ring mounting hole, 506—limiting recess, 507—pressing ring opening, 508—annular body, 600—flexible accommodation body, 601—opening part, 602—accommodating body, 603—small-diameter part, 700—bottom plate, 701—mounting hole, 1300—protecting member, 1301—protecting ring, 1302—insertion groove, 1303—protecting ring opening, 1304—limiting protrusion, 1305—protecting curved surface.

DETAILED DESCRIPTION

A support for household appliance and a household appliance provided by the present disclosure are described in detail below with reference to the drawings.

Embodiment I

Referring to FIG. 1 to FIG. 5, a support for household appliance comprises:

a hydraulic plate 100;

a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300; and a flexible accommodation body 600, which accommodates a liquid medium and is arranged in the accommodation chamber; and the flexible accommodation body 600 extends and retracts to drive the regulating support 300 to axially move in the sheath 200 for leveling under action of pressure;

a fixing member for sealingly mounting the flexible accommodation body 600 on the hydraulic plate 100 and a protecting member 1300 for protecting the flexible accommodation body 600, the fixing member or the protecting member 1300 is embedded in the protecting member 1300 or the fixing member.

According to the support for household appliance, provided by this embodiment, based on the hydraulic principle, the support can perform adaptive regulation automatically by means of the fluidity of the hydraulic medium for different pressures resulting from unflatness, the hydraulic medium stops circulating until the support for household appliance achieves balance, and thus, automatic leveling is achieved.

The support for household appliance of the present disclosure comprises a fixing member and a protecting member 1300, the fixing member or the protecting member 1300 is embedded in the protecting member 1300 or the fixing member which brings the following technical effects.

1. The fixing member and the protecting member 1300 of the present embodiment are embedded and installed, which can play a limit function, avoid setting a complicated limit structure, and is simple and stable.

2. The protecting member 1300 and the flexible accommodation body 600 of the present embodiment are closely in contact with each other with no gaps in between. The expansion rupture of the accommodation body 600 is avoided when the support for the household appliance is under great impact pressure (e.g. when the household appliance or any object with the support for the household appliance installed is dropped or lifted or suddenly placed), the reliability is improved.

3. The fixing member and the protecting member 1300 are embedded and installed, so the installation heights of the fixing member and the protecting member 1300 are decreased, further the whole height of the support for household appliance is decreased. When the support for household appliance is mounted on the household appliance, it has less influence on the overall center of gravity, which is more conductive to the support stability of the household appliance, and has better shock absorption effect on the vibration during the working process of the household appliance (such as the dehydration vibration of the washing machine).

The implantation of the present embodiment is that the fixing member is embedded into the protecting member 1300, and it also can be that the protecting member 1300 is embedded into the fixing member. In addition, the embedding of the present embodiment can be partial embedding or all embedding.

As a preferred embodiment of the present embodiment, one end of the protecting member 1300 is provided with a protecting curved surface 1305, and the protecting curved surface 1305 is matched with the outer surface of the flexible accommodation body 600 to prevent the flexible accommodation body 600 from being damaged by pressure. The protecting member 1300 of the embodiment is provided with a protecting curved surface 1305, such that the flexible accommodation body 600 can be attached to the protective curved surface under pressure to protect the flexible accommodation body.

The other end of the protecting member 1300 of the present embodiment is provided with an insertion groove 1302, and the fixing member is embedded in the insertion groove 1302 of the protecting member 1300. The fixing member of this embodiment can be partially embedded in the insertion groove 1302 or can be entirely embedded in the insertion groove 1302.

The protecting member 1300 of the present embodiment moves up and down during the expansion and contraction of the flexible accommodation body, and needs to limit the circumferential rotation of the protecting member during the movement of the protecting member, so that the flexible accommodation body can be better protected and to ensure the stability of the support for household appliance during leveling. Therefore, the fixing member and/or the protecting member 1300 are/is provided with a limiting mechanism for limiting the circumferential rotation of the protecting member relative to the fixing member.

As a preferred embodiment of the present embodiment, a limiting protrusion 1304 is provided on the inner wall of the insertion groove 1302 of the protecting member 1300, and a limiting recess 506 cooperating with the limiting protrusion 1304 is provided on the fixing member. The limiting structure of the embodiment is designed according to the embedded installation of the fixing member and the protecting member 1300, and the limiting movement is realized at the same time of the embedded installation, and the structure is simple, stable and reliable.

Specifically, the flexible accommodation body 600 of the present embodiment comprises an opening part 601 and a retractable accommodating body 602; the opening part 601 is sealingly mounted on the hydraulic plate 100 by the fixing member; the protecting member 1300 is arranged between the accommodating body 602 and the fixing member; the fixing member is embedded into the protecting member 1300; and the protecting member 1300 is provided with a protecting curved surface 1305 cooperating with the accommodating body 602. Since the leveling of the regulating support 300 is mainly depending on the axial movement of the flexible accommodating body 600 which is driven by the extending and retracting of the accommodating body 602 under pressure, thus, the protecting member 1300 is disposed between the accommodating body 602 and the fixing member. The flexible accommodation body 600 is protected by the protecting curved surface 1305 to avoid damage, ensuring stable and effective leveling and prolonging the service life.

Further, the fixing member is a pressing ring 500, and the pressing ring 500 includes an annular body 508. The inside of the annular body 508 has a pressing ring opening 507. The opening part 601 of the flexible accommodation body 600 passes through the pressing ring opening 507 and is sealingly mounted to the hydraulic plate 100 by the annular body 508. The protecting member 1300 comprises a protecting ring 1301, and a protecting ring opening 1303 for allowing the opening part 601 to pass through is provided inside the protecting ring 1301. The insertion groove 1302 for allowing the pressing ring 500 to be inserted is provided in one end, closing to the pressing ring 500, of the protecting ring 1301. The protecting curved surface 1305 is provided on one end, in touch with the flexible accommodation body 600, of the protecting ring 1301.

The pressing ring 500 of the present embodiment is fixed to the hydraulic plate 100, and presses the opening part 601 of the flexible accommodation body 600 between the compression 500 and the hydraulic plate for sealingly mounting. A liquid passage is formed inside the hydraulic plate 100, and the flexible accommodation body 600 communicates with the liquid passage after it being sealingly mounted to the hydraulic plate 100.

A depth of the insertion groove 1302 of the present embodiment is larger than a thickness of the pressing ring 500 so that the pressing ring 500 can be completely embedded into the insertion groove, thus, the mounting height can be minimized to reduce the overall height of the support for household appliance. At the same time, when the supports for the household appliance are in an uneven state, the flexible accommodation bodies 600 are subjected to different pressures, and the liquid medium flows, and the flexible accommodation body 600 telescopically drives the regulating support 300 to axially move in the sheath 200 for leveling. The expanding and extracting of the flexible accommodation body 600 will act a force on the protecting ring 1301, the protecting ring 1301 axially moves under the limiting of the insertion groove 1302 and the compressing ring 500.

In the present embodiment, the outer circumference of the protecting ring 1301 is designed to completely wrap the pressing ring 500, and only the protecting ring 1301 can be pressed into the regulating support 300, which greatly improves the reliability and the stability of the fit. Therefore, after the protecting ring 1301 is pressed into the regulating support 300, it will be stably moved in the axial direction of the regulating support 300, and the movement is smooth and reliable. The cooperation of the two makes the whole support for household appliance more stable and a certain amount of activity up and down is provided for both the protecting ring 1301 and the pressing ring 500.

To further limit the circumferential rotation of the protecting ring 1301, an internal wall of the insertion groove 1302 of the protecting ring 1301 of the present embodiment is provided with at least one limiting protrusion 1304, an outer peripheral wall of the pressing ring 500 is provided with the limiting recess 506 corresponding to the limiting protrusion 1304.

The limiting protrusion 1304 of the present embodiment is formed by the inner wall of the insertion groove 1302 partially protruding inward, and the limiting recess 506 is formed by the outer peripheral wall of the pressing ring 500 partially recessing or being removed.

Preferably, a plurality of limiting protrusions 1304 are provided, which are respectively distributed along the circumferential direction of the inner wall of the insertion groove 1302. A plurality of limiting recesses 506 are provided, which are correspondingly distributed on the outer peripheral wall of the pressing ring 500. In this way, the stability of the circumferential rotation limit can be increased.

Further, the limiting protrusion 1304 has an arc-shaped limiting outer convex surface, and the limiting recess 506 has an arc-shaped limiting inner concave surface, and the limiting outer convex surface and the limiting inner concave surface cooperate with each other. In this way, a smooth transition between the limit structures can be achieved, which is more conducive to the stable adjustment of the support for the household appliance.

Specifically, the flexible accommodation body 600 of the present embodiment comprises a small-diameter part 603 communicating with the accommodating body 602, an inner diameter of the small-diameter part is smaller than an inner diameter of the accommodating body 602. The end part of the small-diameter part 603 is flanged to form the opening part 601, the fixing member sleeves on the small-diameter part 603 to sealingly mount the opening part to the hydraulic plate 100. The protecting member 1300 sleeves on the small-diameter part 603 and is located between the accommodating body 602 and the fixing member.

An outer diameter of the protecting member of the present embodiment is smaller than the inner diameter of the regulating support 300, thus, when the regulating support 300 moves axially in the sheath 200, the protecting member 1300 moves into the regulating support 300, and it doesn't affect the regulating height of the regulating support.

Embodiment II

Referring to FIG. 6 to FIG. 10, a support for household appliance comprises:

a hydraulic plate 100, which is fixed to the bottom of the household appliance;

a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300; and a flexible accommodation body, which accommodates a liquid medium and is arranged in the accommodation chamber; and the flexible accommodation body extends and retracts to drive the regulating support 300 to axially move in the sheath 200 for leveling under the action of pressure.

According to the support for household appliance, provided by this embodiment, based on the hydraulic principle, the accommodation chamber is formed by the hydraulic plate 100, the sheath 200 and the regulating support 300, and the flexible accommodation body which accommodates the liquid medium is arranged in the accommodation chamber. So that for different pressures resulting from unflatness, the support for household appliance performs adaptive regulation automatically by means of the fluidity of the hydraulic medium; and the liquid medium circulates among all supports, so that the range of regulation is wider, and the effect of regulation is better.

According to the support for household appliance, provided by this embodiment, the hydraulic plate 100 is directly fixed to the bottom of the household appliance, the sheath 200 and the hydraulic plate 100 are fixedly connected. Thus, the hydraulic plate 100 is clamped by the bottom of the household appliance and the sheath 200, the strength of fixed connection between the hydraulic plate 100 and the sheath 200 is not necessary, a main purpose of connection between the hydraulic plate 100 and the sheath 200 is to form an integrated support, and the strength of the connection is irrelevant to the size of gravity of the household appliance and the size of a supporting force of the regulating support 300. Therefore, for the support for household appliance, provided by the present disclosure, the hydraulic plate 100 and the sheath 200 can be rapidly, reliably and fixedly connected, the requirements on the strength of connection between the hydraulic plate 100 and the sheath 200 are lowered, and the essential space and height required by the connection are further lowered.

In summary, the support for household appliance, provided by this embodiment, is simpler in structure, simpler and more convenient in mounting and has better stability.

In addition, in the structural design of the support for household appliance, provided by this embodiment, the overall height of the support for household appliance can be further lowered, and thus, the support for household appliance has a better shock absorption effect on the household appliance. Taking a washing machine as an example, the support for household appliance, provided by the present disclosure, has a better shock absorption effect on dewatering vibration of the washing machine.

In order to guarantee the stability of mounting of the support for household appliance, provided by the embodiment, and meanwhile lower the overall height of the support for household appliance, as a preferred embodiment of the embodiment, the upper end of the sheath 200 is flanged outward to form a mounting plane 201, and the mounting plane 201 is fit with the bottom face of the hydraulic plate 100 and is fixedly connected with the bottom face of the hydraulic plate 100.

According to the embodiment, the mounting plane 201 of the sheath 200 is fit with the hydraulic plate 100, thus, more pressure is transferred to the mounting plane 201 and is dispersed, and the hydraulic plate 100 is prevented from bearing too high pressure. A liquid flow passage for circulating the hydraulic medium is formed inside the hydraulic plate 100, and the stability of the hydraulic plate 100 is a key of the stabilizing and leveling of the entire support for household appliance. According to the embodiment, the mounting plane 201 is formed by the outward flanging of the upper end of the sheath 200, thus, the mounting contact area of the sheath 200 and the hydraulic plate 100 is increased, and the stability and dispersancy of force transfer to the mounting plane 201 of the sheath 200 from the hydraulic plate 100 are better facilitated.

In addition, the mounting plane 201 of the sheath 200 is fit with the hydraulic plate 100 and is fixedly connected with the hydraulic plate 100, designing mounting structures on the sheath 200 or hydraulic plate 100 is omitted, and the overall structure of the support for household appliance is lowered.

Further, in the embodiment, the outline of the mounting plane 201 is matched with that of the hydraulic plate 100, and the mounting plane 201 is fit with the bottom face of the hydraulic plate 100 and is fixedly connected with the bottom face of the hydraulic plate 100. Thus, a pressure force borne by the hydraulic plate 100 can be better correspondingly transferred to the mounting plane of the sheath 200, stress concentration of local parts of the hydraulic plate 100 caused by the mounting plane 201 is avoided, and the stable circulation of the hydraulic medium in the hydraulic plate is better facilitated.

Preferably, in the embodiment, the outline of the hydraulic plate 100 is similar to or the same as that of the mounting plane 201. Thus, the mounting is simpler and more convenient through corresponding the hydraulic plate 100 and the mounting plane 201.

Concretely, in the embodiment, the sheath 200 comprises an internal hollow sleeve part, one end of the regulating support 300 is sleeved by the sleeve part and the regulating support can axially move relatively. The upper end of the sleeve part is flanged outward to form the mounting plane 201, and the mounting plane 201 is fit with the bottom face of the hydraulic plate 100 and is fixedly connected with the bottom face of the hydraulic plate 100. According to the embodiment, the mounting plane 201 is formed by the outward flanging of the upper end of the sleeve part, the regulating support 300 axially moves in the sheath 200. Only the area of the mounting plane is increased while the whole sheath 200 is not enlarged, thus, materials are saved, and the cost is reduced.

Concretely, in the embodiment, the hydraulic plate 100 is of a square flat-plate structure, the sleeve part is of a cylindrical structure, an outward flanging of the upper end of the cylindrical structure forms the square mounting plane 201 which is matched with the hydraulic plate, and the square flat-plate structure is fit with the square mounting plane and is fixedly connected with the square mounting plane.

In order to achieve that the support for household appliance, provided by the embodiment, is fixedly mounted at the bottom of the household appliance, concretely, the sheath 200 and the hydraulic plate 100 are fixedly mounted at the bottom of the household appliance through connecting devices, and the hydraulic plate 100 is clamped between the mounting plane 201 of the sheath 200 and a bottom plane of the household appliance.

As a mounting mode of the embodiment, the bottom of the household appliance provided by the embodiment is provided with a bottom plate 700, mounting holes 701 are formed in the bottom plate 700, hydraulic plate holes 102 are formed in the hydraulic plate 100, and sheath holes 203 are formed in the sheath 200. The connecting devices are connecting bolts/connecting screws, and the connecting bolts/connecting screws sequentially penetrate through the sheath holes 203 and the hydraulic plate holes 102 and are fastened to the mounting holes 701. According to the embodiment, the fixed mounting of the sheath 200, the hydraulic plate 100 and the bottom plate 700 of the household appliance is achieved in one time through the connecting bolts/connecting screws, and the mounting is simple and convenient.

Further, the holes of the sheath 200 are uniformly distributed along the circumferential direction of the mounting plane 201, the hydraulic plate holes 102 are uniformly distributed along the circumferential direction of the hydraulic plate 100, and the mounting holes 701 are formed in the bottom plate 700 of the household appliance corresponding to the hydraulic plate holes 102 and the sheath holes 203. Thus, the stability of fixed mounting can be improved.

Preferably, at least two mounting holes 701, at least two hydraulic plate holes 102 and at least two sheath holes 203 are formed. Further, preferably, four mounting holes 701, four hydraulic plate holes 102 and four sheath holes 203 are formed to correspond to the square flat-plate structure and the square mounting plane.

As a mounting mode of the embodiment, the sheath 200 and the hydraulic plate 100 are fixedly connected in a snap-in connection, bonding, hot-melting or welding manner and then are fixedly mounted at the bottom of the household appliance.

According to the embodiment, the hydraulic plate 100 is made of plastics through integral injection molding or made of metal through die-casting, and the sheath is made of plastics through integral injection molding or made of a metallic material through die-casting.

According to stress characteristics of the support for household appliance, provided by the embodiment, preferably, the hydraulic plate 100 is made of plastics through integral injection molding, and the sheath 200 is made of metal through die-casting. Because the sheath 200 is subjected to greater stress, the sheath 200 is made of metal through die-casting to guarantee strength, thus, the support for household appliance, provided by the embodiment, is lower in manufacturing cost, and the overall strength of the support for household appliance is guaranteed.

Partial gravity F1 of the household appliance is applied to the hydraulic plate 100 through the bottom plate 700, stress of a plane of the hydraulic plate 100 is transferred to the mounting plane 201 of the sheath 200, stress of the interior of the hydraulic plate 100 is transferred to the regulating support 300 through hydraulic pressure, the regulating support 300 similarly bears a supporting force F2 from a supporting surface, the F1 is equal to the F2, stress of the regulating support 300 is transferred to the plane of the hydraulic plate 100, and the stress is then transferred to the bottom plate 700 of the household appliance by the hydraulic plate 100. By such a design, although the hydraulic plate 100 bears a pressure force of internal liquid flow passage, a partial gravity force of the washing machine and the supporting force of the regulating support 300, the forces are all transferred to the mounting plane 201 of the sheath 200, the regulating support 300 and the bottom plate 700 of the household appliance.

Embodiment III

Referring to FIG. 11 to FIG. 14, a support for household appliance comprises:

a hydraulic plate 100, which is fixed to the bottom of the household appliance;

a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300; and a flexible accommodation body 600, which accommodates a liquid medium and is arranged in the accommodation chamber; and the flexible accommodation body 600 extends and retracts to drive the regulating support 300 to axially move in the sheath 200 for leveling under the action of pressure; and the hydraulic plate 100 is locally embedded inside the sheath 200.

According to the support for household appliance, provided by this embodiment, based on the hydraulic principle, the support can perform adaptive regulation automatically by means of the fluidity of the hydraulic medium for different pressures resulting from unflatness, the hydraulic medium stops circulating until the support for household appliance achieves balance, and thus, automatic leveling is achieved.

According to the support for household appliance, provided by the embodiment, the household appliance is automatically leveled by using the hydraulic principle, and the leveling is simple and reliable; and as the household appliance (for example, a washing machine) generally generates vibration during working, in order to guarantee the stability of running of the household appliance, the overall height of the support for household appliance, provided by the embodiment, should be lowered as far as possible to lower the center of gravity of the household appliance.

According to the support for household appliance, provided by the embodiment, the hydraulic plate 100 is locally embedded inside the sheath 200, thus, the overall height of the support for household appliance is reduced while the overall strength of the hydraulic plate 100 is guaranteed, and the household appliance can achieve better shock absorption stability. In addition, the hydraulic plate 100 is locally embedded inside the sheath 200, and thus, the sheath 200 also plays a certain role in protecting the hydraulic plate 100.

Concretely, in the embodiment, a bulging embedding part 108 is arranged on one face, facing to the sheath 200, of the hydraulic plate 100 and is embedded inside the sheath 200. According to the embodiment, the embedding part 108 bulges from the hydraulic plate 100, thus, the hydraulic plate 100 has adequate strength, and the stability of flowing of the hydraulic medium in the hydraulic plate 100 is guaranteed;

and the embedding part 108 is embedded inside the sheath 200, thus, the thickness of mounting of the hydraulic plate 100 is reduced, the overall height of the support for household appliance is reduced, and the household appliance can have better supporting stability.

Further, in the embodiment, the sheath 200 comprises an internal hollow sleeve part, and one end of the regulating support 300 is sleeved by the sleeve part and the regulating support is axially movable relatively. The upper end of the sleeve part is flanged outward to form the mounting plane 201, and the mounting plane 201 is fit with the bottom face of the hydraulic plate 100 and is fixedly connected with the bottom face of the hydraulic plate 100; and the embedding part 108 is embedded inside a sleeve part. According to the embodiment, the embedding part 108 further has a locating function when the hydraulic plate 100 and the sheath 200 are fixedly connected.

Further, in the embodiment, the hydraulic plate comprises a square plate body, the sleeve part is of a cylindrical structure, an outward flanging of the upper end of the cylindrical structure forms a square mounting plane which is matched with the hydraulic plate, and a square flat-plate structure is fit with the square mounting plane and is fixedly connected with the square mounting plane; and the embedding part 108 is a cylindrical bulge which bulges from the surface of the square plate body, and the cylindrical bulge is embedded inside the cylindrical structure.

According to the embodiment, a mounting structure between the hydraulic plate 100 and the sheath 200 is designed according to structural features of the hydraulic plate 100 and the sheath 200, and the square flat-plate structure is fit with the square mounting plane and is fixedly connected with the square mounting plane, so that the mounting is simple and convenient, and the overall height is reduced. The embedding part 108 is embedded inside the cylindrical structure, and the overall strength of the hydraulic plate 100 is ensured by using an internal space of the cylindrical structure; and the embedding part 108 is designed into the cylindrical bulge and can be matched with the interior of the cylindrical structure to exert a locating function, and the fixed connection between the hydraulic plate 100 and the sheath 200 is better facilitated.

According to the embodiment, the hydraulic medium in the flexible accommodation body 600 flows through the liquid flow passage 107 in the hydraulic plate 100, and the accommodation chamber is formed by the hydraulic plate 100, the sheath 200 and the regulating support 300. Therefore, in order to guarantee that the hydraulic medium in the flexible accommodation body 600 can enter the hydraulic plate 100, a hydraulic plate groove 104 is formed in an end face of a part, embedded inside the sheath, of the hydraulic plate 100; the flexible accommodation body 600 has an opening part, and the opening part of the flexible accommodation body 600 is deformed under pressure of a pressing ring 500 and fills the hydraulic plate groove 104 for sealing. According to the embodiment, the hydraulic plate 100 is partially embedded in the sheath 200, so that the hydraulic medium in the flexible accommodation body 600 can circulate into the liquid flow passage 107 in the hydraulic plate 100 by directly mounting the flexible accommodation body 600 to the embedding part in a sealed manner.

Preferably, the hydraulic plate groove 104 is formed in the end face of the embedding part 108.

According to the embodiment, the embedding part of the hydraulic plate 100 concerns the overall strength of the hydraulic plate 100 and also concerns the sealed mounting of the flexible accommodation body 600, so that the embedding part 108 comprises a first embedding part 108 bulging from a plane of the hydraulic plate and a second embedding part 106 bulging from a plane of the first embedding part 108. The first embedding part 108 is mainly used for enhancing the overall strength of the hydraulic plate 100, and the second embedding part 106 is mainly used for achieving the sealed mounting of the flexible accommodation body 600 to further enhance the overall strength of the hydraulic plate 100.

In order to achieve that the flexible accommodation body 600 is mounted on the hydraulic plate 100 in a sealed manner, the pressing ring 500 comprises a radial projecting part 501, the inner diameter of the radial projecting part 501 is smaller than the outer diameter of the opening part of the flexible accommodation body 600, the pressing ring 500 is fixed to the bottom face of the first embedding part 106, and the opening part of the flexible accommodation body 600 is deformed under pressure of the radial projecting part 501 and fills the hydraulic plate groove 104 for sealing.

Further, the hydraulic plate 100 further comprises liquid outlet nozzles 101, and the liquid flow passage 107 is formed inside the hydraulic plate 100 and communicates with the liquid outlet nozzles 101 and the interior of the flexible accommodation body 600; and the liquid outlet nozzles 101 are arranged in a manner of being lower than an upper plane of the hydraulic plate 100. According to the embodiment, the liquid outlet nozzles 101 are mainly used for being connected with high-pressure pipes, at least two household-appliance-used supports, provided by the embodiment, communicate with one another through the high-pressure pipes, thus, the hydraulic medium can circulate among the household-appliance-used supports, and leveling is carried out based on the hydraulic principle. According to the embodiment, a certain distance H4 is present between the plane of the hydraulic plate and the liquid outlet nozzles 101, thus, the liquid outlet nozzles 101 are lower than or level with the plane of the hydraulic plate after the liquid outlet nozzles 101 are connected with the high-pressure pipes, and the condition that the liquid outlet nozzles 101 are subjected to flexural deformation due to a bottom plate plane of the household appliance after the support for household appliance is fixed to a bottom plate of the household appliance is prevented.

The liquid outlet nozzles 101 are arranged in a manner of bulging from the periphery edge of the hydraulic plate 100, the periphery of the hydraulic plate 100 is mainly mounted in a manner of being fit with the mounting plane 201 of the sheath 200, thus, in order to reduce the overall height, the thickness of the periphery of the hydraulic plate 100 is small. Thus, pipe diameters of the liquid outlet nozzles 101 are very small, however, too small pipe diameters are not only unfavorable to the circulation of the hydraulic medium, but also cause insufficient strength, and fracture is extremely easily caused. According to the embodiment, a projecting base part 109 is further formed on the bottom face of the hydraulic plate 100, and the liquid outlet nozzles 101 are arranged on the base part 109. Thus, in view of the requirements of the liquid outlet nozzles 101 on structural strength, local reinforced base parts 109 are designed for the hydraulic plate 100, thus, the pipe diameters of the liquid outlet nozzles 101 can be enlarged, and the fracture of the liquid outlet nozzles 101 is avoided.

Preferably, the projecting base part 109 and the embedding part are arranged in a same level and are interconnected. According to the embodiment, the liquid flow passage 107 inside the hydraulic plate 100 is arranged at the embedding part, and the influence on the flowing of the hydraulic medium in the a liquid flow passage 107 caused by outside pressure is avoided due to greater thickness of the embedding part, so that by arranging the base parts 109 and the embedding part in a same level, the liquid flow passage 107 can horizontally extend to the liquid outlet nozzles 101, and the stable circulation of the hydraulic medium is ensured.

Further, in view of a structure of the sheath 200, the upper end part of the sheath 200 is flanged to form the mounting plane 201, so that liquid nozzle outlets 206 which are used for the yielding mounting of the liquid outlet nozzles 101 are formed in the sheath 200. Thus, the liquid outlet nozzles 101 can be mounted in a non-interference manner.

Preferably, openings which communicating with each other are correspondingly formed in the mounting plane 201 and the sleeve part respectively to form the liquid nozzle outlets 206, and the base part 109 is embedded in the liquid nozzle outlets for the yielding mounting of the liquid outlet nozzles 101.

Figure 8:
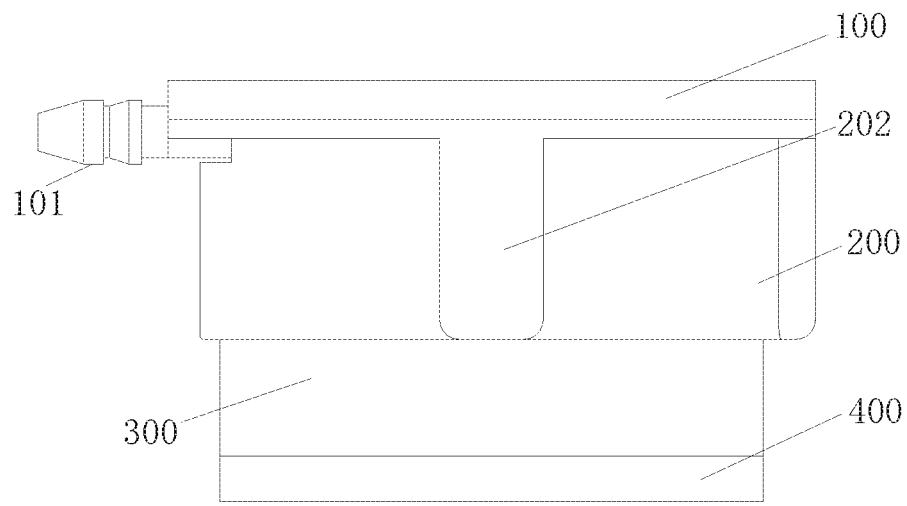
FIG. 8 is a front view of a support for household appliance of embodiment II of the present disclosure.
Figure 9:
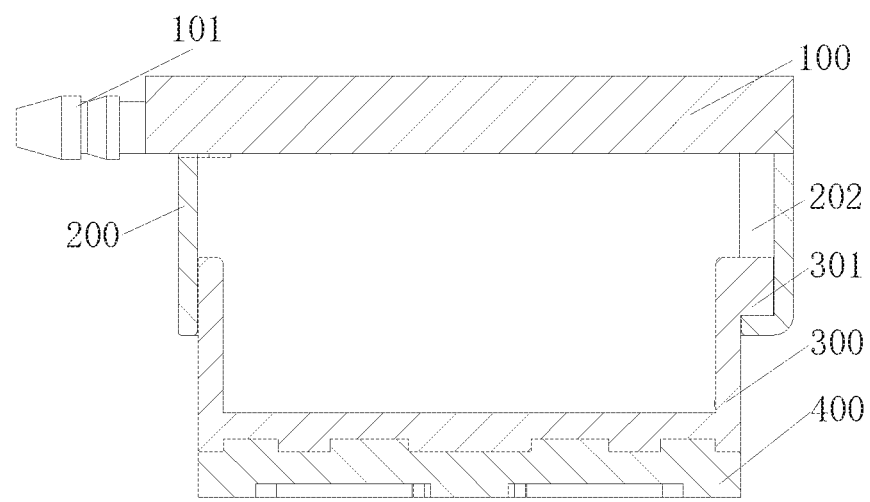
FIG. 9 is a sectional view of the support for household appliance of embodiment II of the present disclosure.
Figure 10:
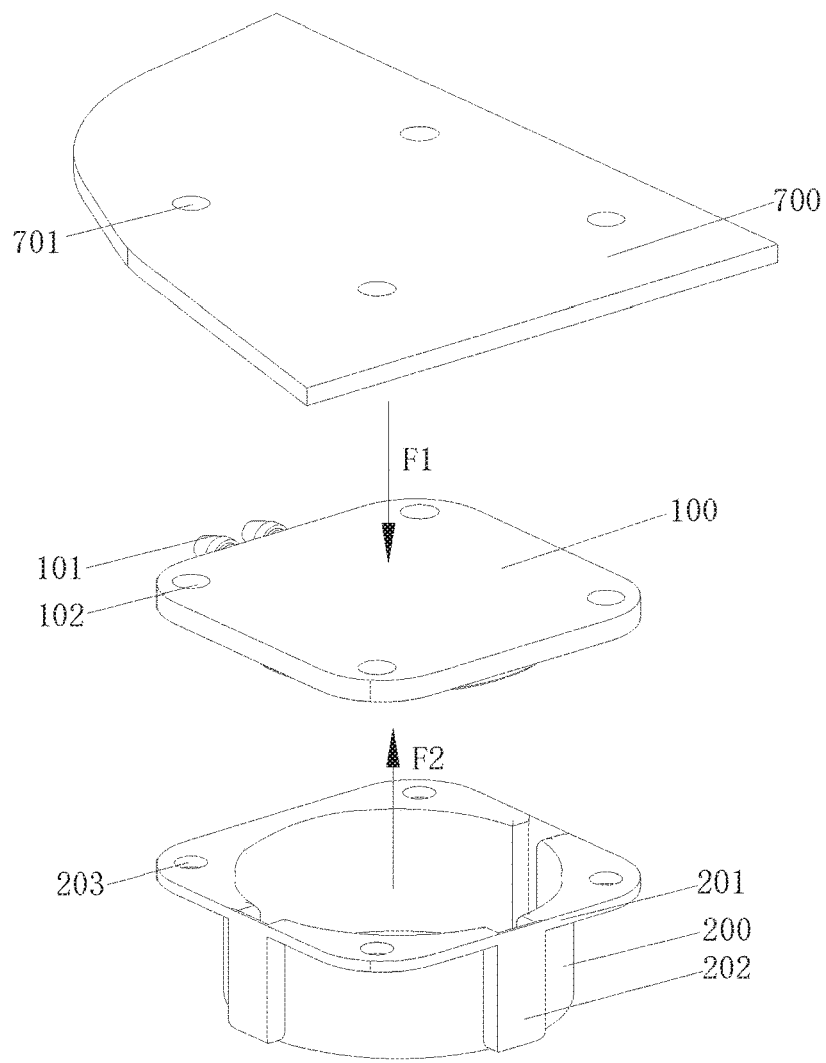
FIG. 10 is a mounting schematic diagram of the support for household appliance of embodiment II of the present disclosure.
Figure 11:
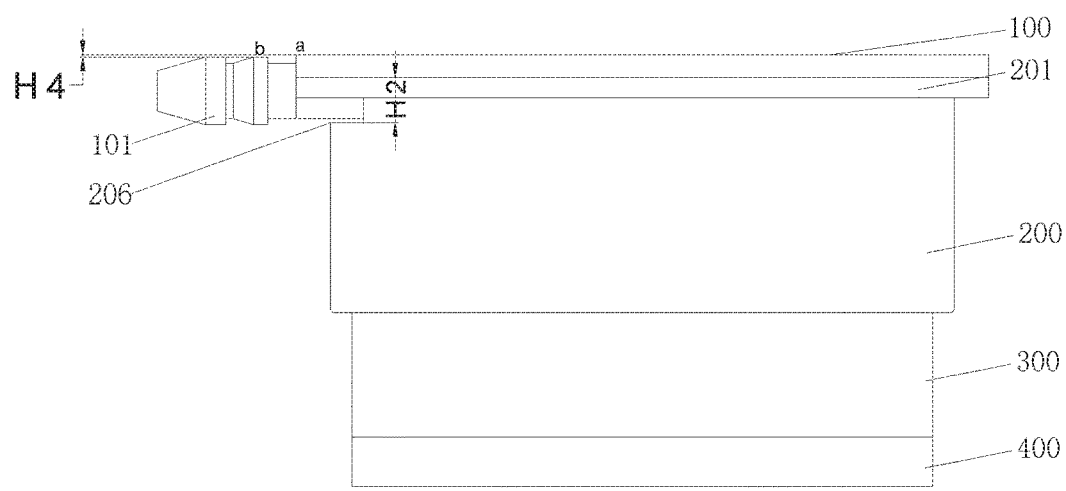
FIG. 11 is a front view of the support for household appliance of embodiment III of the present disclosure.
Figure 12:
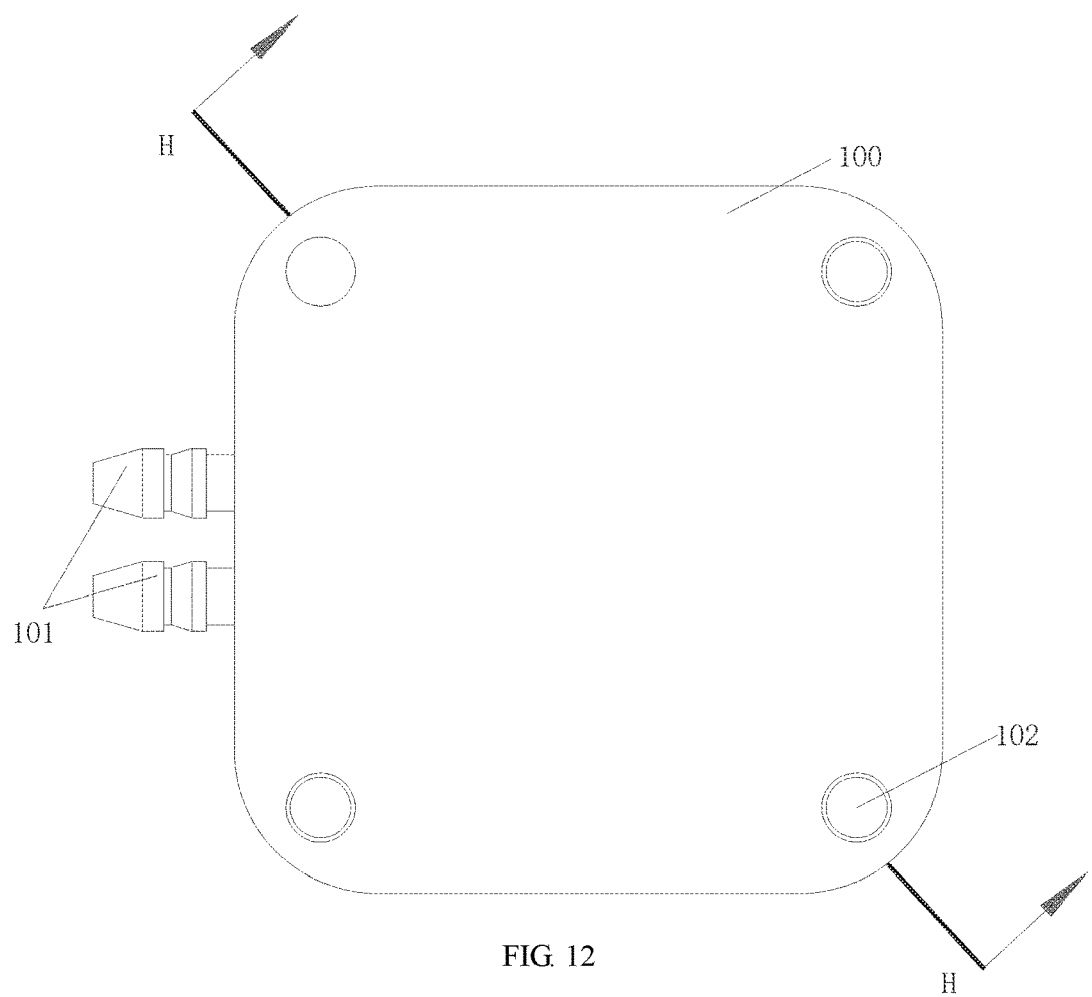
FIG. 12 is a top view of a support for household appliance of an embodiment III of the present disclosure.
Figure 13:
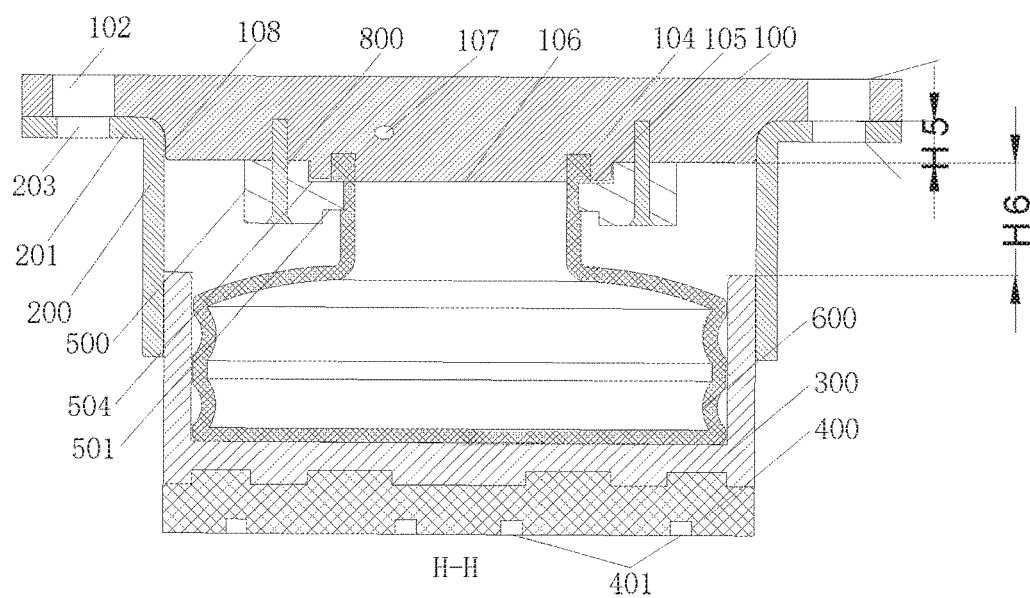
FIG. 13 is a sectional view of the support for household appliance of embodiment III of the present disclosure along a plane H-H in the FIG. 7.
Figure 14:
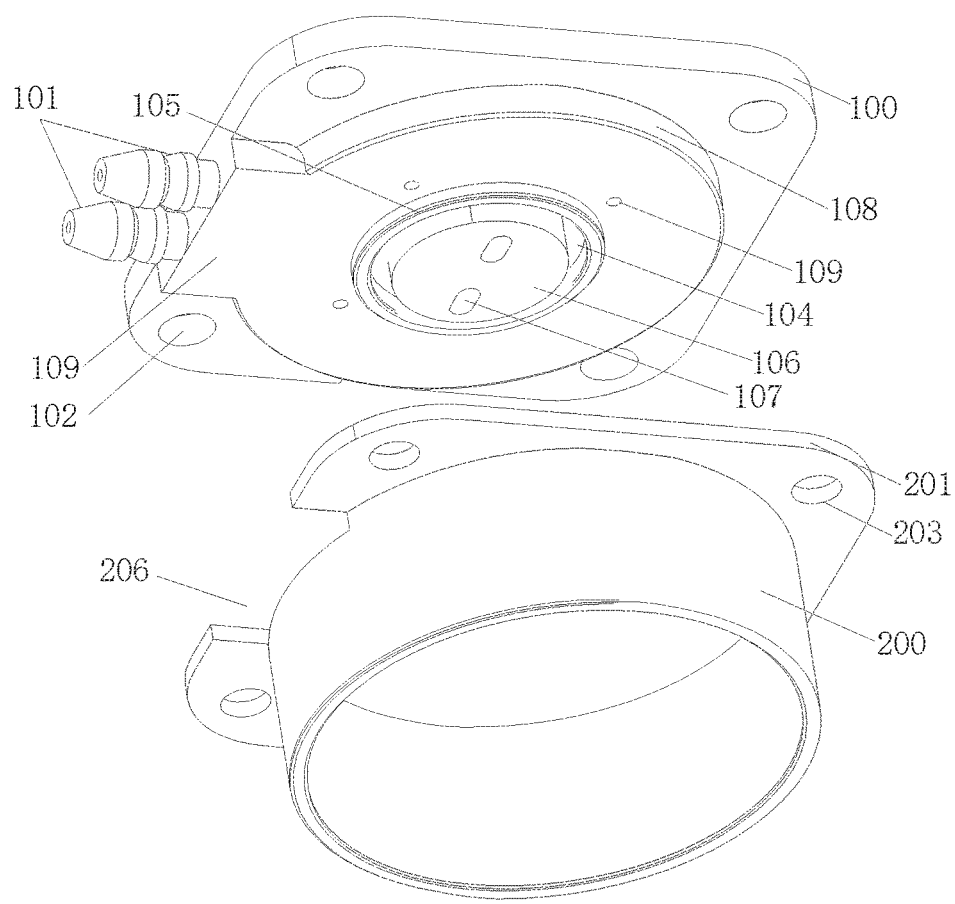
FIG. 14 is a local exploded view of the support for household appliance of embodiment III of the present disclosure.
Figure 15:
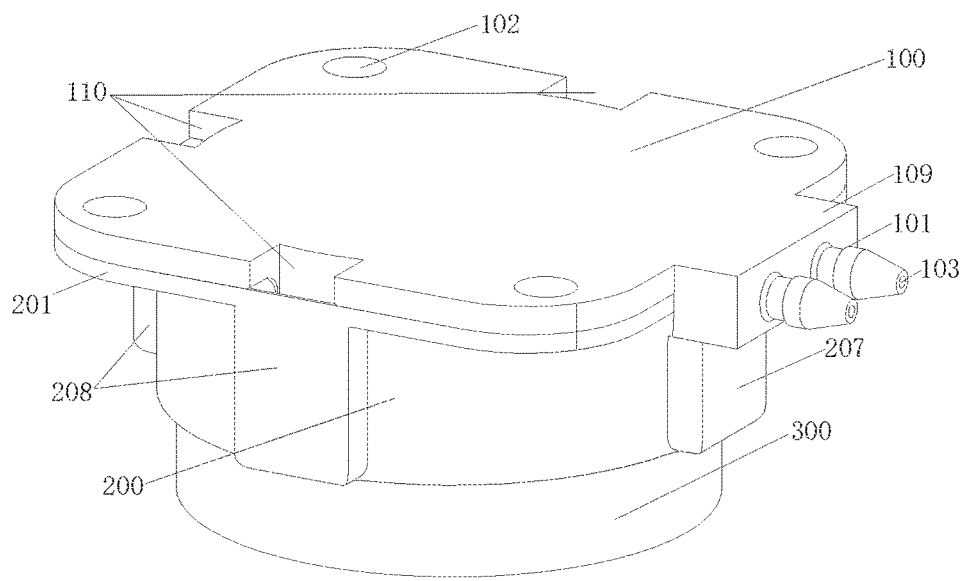
FIG. 15 is a three-dimensional structural schematic diagram of a support for household appliance of embodiment IV of the present disclosure.

According to the embodiment, the hydraulic plate 100 has the embedding part and is partially embedded to the sheath 200 by a certain distance, i.e., H5 shown in FIG. 8, so that the embedding part is protected by an inner-tube structure of the sheath 200, the reliability is improved, the height of the entire structure is reduced, and meanwhile, the shock absorption performance is further improved.

Due to a partial embedded design of the hydraulic plate 100, positions of the liquid outlet nozzles 101 are lowered; yielding ports are formed in the sheath 200 corresponding to the positions of the liquid outlet nozzles 101, so that the liquid outlet nozzles 101 can stretch out without interference; and the base part 109 which is used for exerting a strengthening action are designed at connections of the liquid outlet nozzles 101 and the hydraulic plate 100.

Embodiment IV

Referring to FIG. 15 to FIG. 21, a support for household appliance comprises:
a hydraulic plate 100;
a sheath 200, which is fixedly connected with the hydraulic plate 100;
a regulating support 300, which is arranged in the sheath 200 and is axially movable relative to the sheath 200;
an accommodation chamber, which is formed by the hydraulic plate 100, the sheath 200 and the regulating support 300; and
a flexible accommodation body 600, which accommodates a liquid medium and is arranged in the accommodation chamber;
the flexible accommodation body 600 extends and retracts to drive the regulating support 300 to axially move in the sheath 200 for leveling under the action of pressure; and
the sheath 200 and/or the regulating support 300 are/is provided with a guiding limiting mechanism which is used for limiting the circumferential rotation of the regulating support 300 relative to the sheath 200, and a yielding part corresponding to the guiding limiting mechanism is formed in the hydraulic plate 100.

According to the support for household appliance, provided by this embodiment, based on the hydraulic principle, the support can perform adaptive regulation automatically by means of the fluidity of the hydraulic medium for different pressures resulting from unflatness, the hydraulic medium stops circulating until the support for household appliance achieves balance, and thus, automatic leveling is achieved.

According to the support for household appliance, provided by the embodiment, the household appliance is automatically leveled by using the hydraulic principle, and the leveling is simple and reliable. The regulating support 300 is arranged in the sheath 200 in a manner of being capable of axially moving relative to the sheath 200, and the regulation on the household appliance is only limited to a vertical direction, so that in order to guarantee the stability of leveling, the rotation of the regulating support 300 relative to the sheath 200 is required to be limited. Therefore, the guiding limiting mechanism is used for limiting the regulating support 300 to move along a required direction relative to the sheath 200.

As the household appliance (for example, a washing machine) generally will generate vibration during working, in order to guarantee the stability of running of the household appliance, the overall height of the support for household appliance, provided by the embodiment, should be lowered as far as possible to lower the center of gravity of the household appliance. Therefore, the yielding part is formed in the hydraulic plate 100 corresponding to the guiding limiting mechanism, the axial moving of the regulating support 300 is not affected while the guiding limiting mechanism is arranged, the overall height of the support for household appliance is lowered, and the stability of shock absorption of the support for household appliance is improved. Concretely, the guiding limiting mechanism comprises a guiding limiting groove/guiding limiting convex portion arranged on the internal wall of the sheath and guiding limiting convex portion/guiding limiting groove correspondingly arranged on the external wall of the regulating support. The guiding limiting convex portions are arranged in the guiding limiting grooves in a relative slidable manner to limit the circumferential rotation of the regulating support relative to the sheath. According to the embodiment, the axial moving of the regulating support 300 is guided through matching between the guiding limiting grooves and the guiding limiting convex portions, and thus, the structure is simple and reliable.

According to the embodiment, the yielding part is provided corresponding to the guiding limiting convex portion/guiding limiting groove of the regulating support 300, the regulating support 300 moves towards the hydraulic plate 100, and one end of each guiding limiting convex portion/guiding limiting groove of the regulating support 300 enters one corresponding yielding part. According to the embodiment, in view of the axial moving of the regulating support 300, only the yielding part is required to be arranged corresponding to the guiding limiting convex portion/guiding limiting groove of the regulating support 300 regardless of the type of the guiding limiting mechanism, so that on the premise of not changing regulating height, the overall height of the support for household appliance is lowered, and the stability of guiding and limiting is guaranteed.

As a preferred implementation mode of the embodiment, guiding limiting groove 202 is provided in the internal wall of the sheath 200 along an axial direction of the sheath 200, guiding limiting convex portion 301 is arranged on the external wall of the regulating support 300 and the guiding limiting convex portion 301 is arranged in the guiding limiting groove 202 in a relative slidable manner to limit the circumferential rotation of the regulating support 300 relative to the sheath 200.

According to the embodiment, the yielding part is a passage 110 formed in the hydraulic plate 100 corresponding to the guiding limiting convex portion 301, the regulating support 300 axially moves up and down in the sheath 200, and one end of each guiding limiting convex portion 301 goes into/out of one corresponding passage 110.

Therefore, according to the support for household appliance, provided by the embodiment, one end of each guiding limiting convex portion 301 goes into/out of one corresponding passage, so that a greater regulating height is present under the condition of the same overall height; and under the condition of the same regulating height, the support for household appliance, provided by the embodiment, can have a smaller overall height.

As a preferred implementation mode of the embodiment, each guiding limiting convex portion 301 comprises a first guiding limiting block 302 and a second guiding limiting block 303. The first guiding limiting block 302 is fixed to the external wall of the regulating support 300, and the second guiding limiting block 303 is fixed to the first guiding limiting blocks 302 and extends by a certain height towards the hydraulic plate 100. According to the embodiment, the first guiding limiting block 302 mainly plays a role in carrying out guiding and limiting in the guiding limiting groove 202, the second guiding limiting block 303 prolongs the first guiding limiting block 302, and thus, the stability of guiding and limiting is better.

According to the embodiment, the passage 110 is formed corresponding to the second guiding limiting block 303, the regulating support 300 axially moves up and down in the sheath 200, and the second guiding limiting block 303 goes into/out of the passage 110. Thus, the stability of guiding and limiting is improved on the premise of not increasing the overall height of the support for household appliance.

Further, the height of the second guiding limiting block 303 is smaller than or equal to the thickness of the hydraulic plate 100. Thus, the second guiding limiting block 303 will not stretch out of the upper part of the hydraulic plate 100 and affect the axial moving of the regulating support 300 when the second guiding limiting block 303 goes in/out of the passage 110.

As a preferred implementation mode of the embodiment, a plurality of guiding limiting mechanisms are provided and are separately distributed along circumferential direction of the sheath 200 and/or the regulating support 300, and a plurality of yielding parts are provided in the hydraulic plate 100 corresponding to the guiding limiting mechanisms. By arranging several guiding limiting mechanisms, the stability of limiting is further improved, and the effect of guiding and limiting is better.

Preferably, a plurality of guiding limiting grooves 202 are distributed in the internal wall of the sheath 200 along a circumferential direction, a plurality of guiding limiting convex portions 301 are formed on the external wall of the regulating support 300 corresponding to the guiding limiting grooves 202, and a plurality of yielding parts are formed on the hydraulic plate 100 corresponding to the guiding limiting convex portions 301.

Concretely, in view of a concrete structure of the hydraulic plate 100 and a concrete structure of the sheath 200 and in the present embodiment, the hydraulic plate 100 comprises a plate-type body, a base part 109 bulging from the bottom face of the plate-type body and liquid outlet nozzles 101 arranged on the base parts 109. According to the embodiment, a first guiding limiting groove 208 corresponding to the plate-type body and a second guiding limiting groove 207 corresponding to the base part 109 are formed in the internal wall of the sheath 200, and first guiding limiting convex portion matches with the first guiding limiting groove 208 and second guiding limiting convex portion matches with the second guiding limiting groove are formed on the external wall of the regulating support 300.

The yielding part is arranged on the hydraulic plate 100 corresponding to the first guiding limiting convex portion, the regulating support 300 moves towards the hydraulic plate 100, and one end of each first guiding limiting convex portion enters one corresponding yielding part.

The liquid outlet nozzle 101 communicates with the liquid flow passage, so that in order to guarantee the stability of flowing of the hydraulic medium, yielding part is not formed on the hydraulic plate 100 corresponding to the liquid outlet nozzle 101 anymore.

Concretely, the first guiding limiting convex portion comprises a first guiding limiting block 302 bulging from the external wall of the regulating support 300; and the second guiding limiting convex portion comprises a first guiding limiting block 302 bulging from the external wall of the regulating support 300 and a second guiding limiting block 303 which is fixed to the first guiding limiting blocks 302 and extends towards the hydraulic plate by a certain height.

According to the embodiment, the sheath 200 comprises an internal hollow sleeve part, and one end of the regulating support 300 is sleeved by the sleeve part and is axially movable relatively; the upper end of the sleeve part is flanged outward to form the mounting plane 201, and the mounting plane 201 is fit with the bottom face of the plate-type body and is fixedly connected with the bottom face of the plate-type body; and the circumferential wall of the sleeve part outwards bulges to form a guiding limiting groove which is a same level with the mounting plane.

According to the embodiment, in order to achieve the up and down movement of the regulating support 300 in the sheath 200 and prevent circumferential rotation, a certain quantity of guiding limiting grooves 202 are formed in the circumference of the sheath 200, and the quantity is N which is greater than or equal to 1. In a graphic illustration of the present disclosure, N is 4 preferably.

Corresponding guiding limiting convex portion 301 is arranged on the circumference of the regulating support 300, and the quantity of the guiding limiting convex portions is N which is greater than or equal to 1. In a graphic illustration of the present disclosure, N is 4 preferably. The guiding limiting convex portion 301 can move in the guiding limiting groove and is limited by a stopping part 209 of bottom of the guiding limiting groove 202 to prevent the regulating support 300 from falling off from the sheath 200.

In order to reduce the height of the support for household appliance as far as possible and achieve better stability, the height of the sheath 200 and the height of the regulating support 300 can be reduced as far as possible in principle, particularly the height of a superposed part, i.e., H1 in a graphic illustration under the condition of not lowering a regulating height H0. When H1 is very small, the limiting action of the sheath 200 to the regulating support 300 will be lowered, and the problem such as biasing of the regulating support 300 is caused.

According to the embodiment, the passage 110 is ingeniously formed in the hydraulic plate 100 corresponding to the guiding limiting groove 202, each guiding limiting convex portion 301 comprises a first guiding limiting block 302 and a second guiding limiting block 303. The height of the second guiding limiting block 303 H2 is higher than the circumferential face of the first guiding limiting block 302, and the inner diameter of the second guiding limiting block 303 is greater than outer diameter of the regulating support 300. The second guiding limiting block 303 of the regulating support 300 is further limited in the guiding limiting groove 202 of the sheath 200, and the action of no biasing and stability can be achieved even if the superposed H1 is very small. The circumferential face of the first guiding limiting block 302 is in contact with the hydraulic plate 100 to achieve a movement distance H0; at this time, the second guiding limiting block 303 will not shorten a movement distance, and the second guiding limiting block 303 can further enter the passage 110 of the hydraulic plate 100 as the hydraulic plate has the thickness of H3; and preferably, the height H2 of the guiding limiting bulges is smaller than or equal to the H3.

Embodiment V

Referring to FIG. 6 to FIG. 8 and FIG. 21 to FIG. 29, a support for household appliance comprises:

a hydraulic plate 100, which is internally provided with a liquid flow passage 107;

a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300; and a flexible accommodation body 600, which accommodates a liquid medium and is arranged in the accommodation chamber;

the flexible accommodation body 600 extends and retracts to drive the regulating support 300 to axially move in the sheath 200 for leveling under the action of pressure; and the flexible accommodation body 600 has an opening part 601, and the opening part 601 is mounted on the hydraulic plate 100 in a sealed manner and communicates with the a liquid flow passage 107.

According to the support for household appliance, provided by this embodiment, based on the hydraulic principle, the support can perform adaptive regulation automatically by means of the fluidity of a hydraulic medium for different pressures resulting from unflatness, the hydraulic medium stops circulating until the support for household appliance achieves balance, and thus, automatic leveling is achieved.

The stability of flowing of liquid is a key for achieving the leveling of the support for household appliance, provided by the embodiment, the opening part 601 of the flexible accommodation body 600 is mounted on the hydraulic plate 100 in a sealed manner, the hydraulic medium in the flexible accommodation body 600 can circulate into the a liquid flow passage 107 and flow to liquid outlet nozzles 101 through the a liquid flow passage 107, and thus, the hydraulic medium can circulate among the household-appliance-used supports for automatic leveling.

As a preferred implementation mode of the embodiment, in the embodiment, the opening part 601 of the flexible accommodation body 600 is fixedly mounted on the bottom face of the hydraulic plate 100 through the pressing ring 500, and the opening part is deformed under joint pressure of the pressing ring 500 and the hydraulic plate 100 for sealing. According to the embodiment, the opening part is deformed under pressure of the pressing ring 500 for sealing, so that the sealing is simpler and more convenient, and the sealing effect is good.

Further, the flexible accommodation body 600 comprises a small-diameter part 603, the end part of the small-diameter part 603 is flanged to form the opening part 601, the pressing ring 500 sleeves on the small-diameter part 603, and the opening part 601 is deformed under joint pressure of the pressing ring 500 and the hydraulic plate 100 for sealing. According to the embodiment, during the sealed mounting of the flexible accommodation body 600, the small-diameter part 603 can be firstly nested in the pressing ring 500, only the pressing ring 500 is required to be fixedly mounted, the pressing ring 500 presses the opening part 601 during fastening, and thus, the sealed mounting is achieved.

Figure 16:
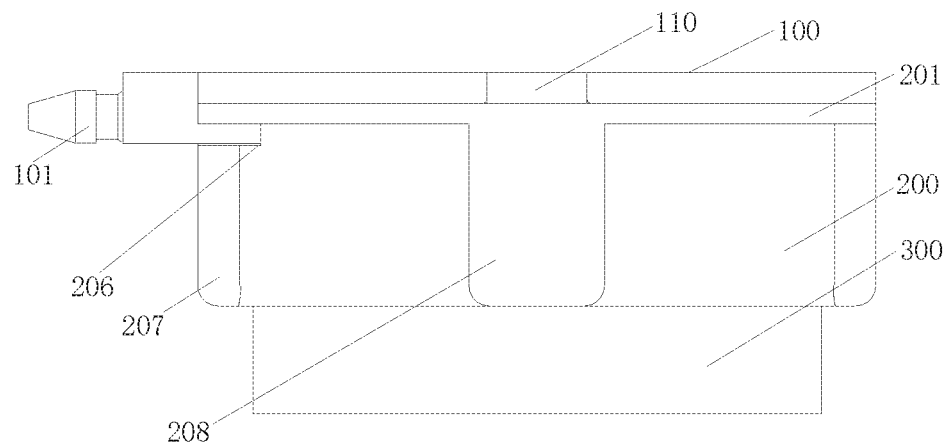
FIG. 16 is a front view of the support for household appliance of embodiment IV of the present disclosure.
Figure 17:
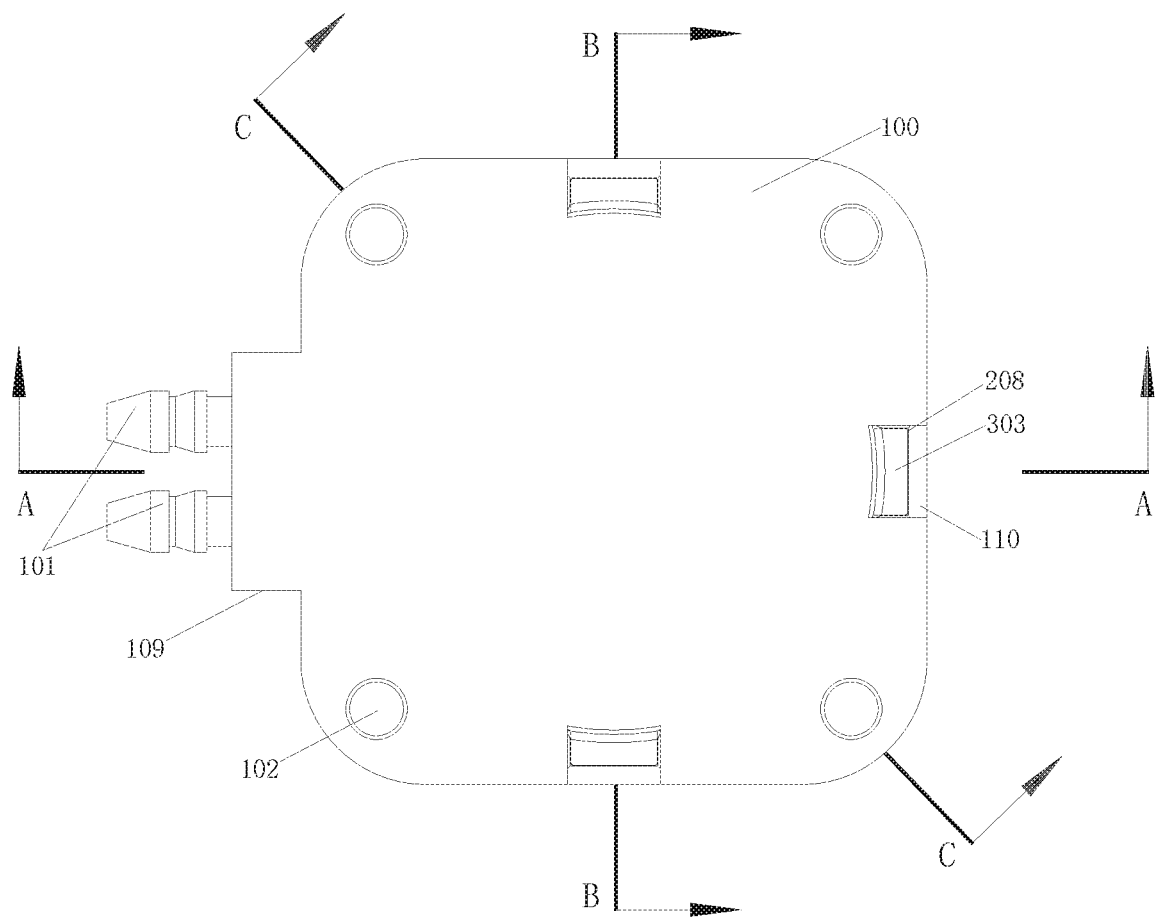
FIG. 17 is a top view of the support for household appliance of embodiment IV of the present disclosure.
Figure 18:
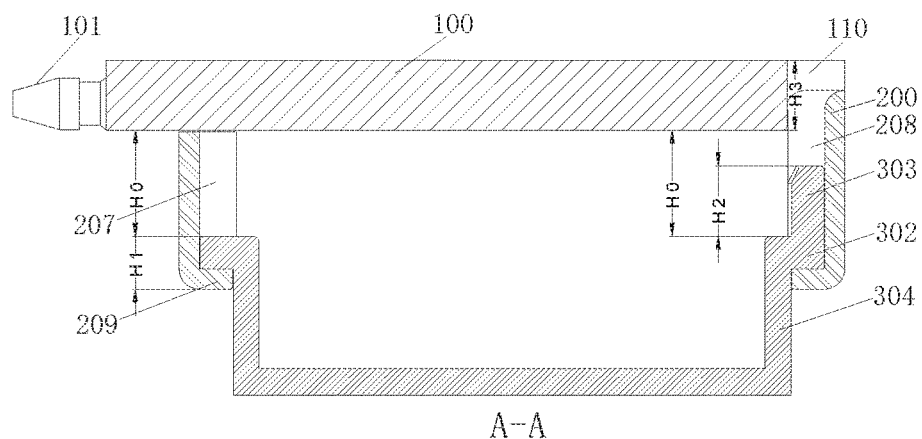
FIG. 18 is a sectional view of the support for household appliance of embodiment IV of the present disclosure along a plane A-A in the FIG. 12.
Figure 19:
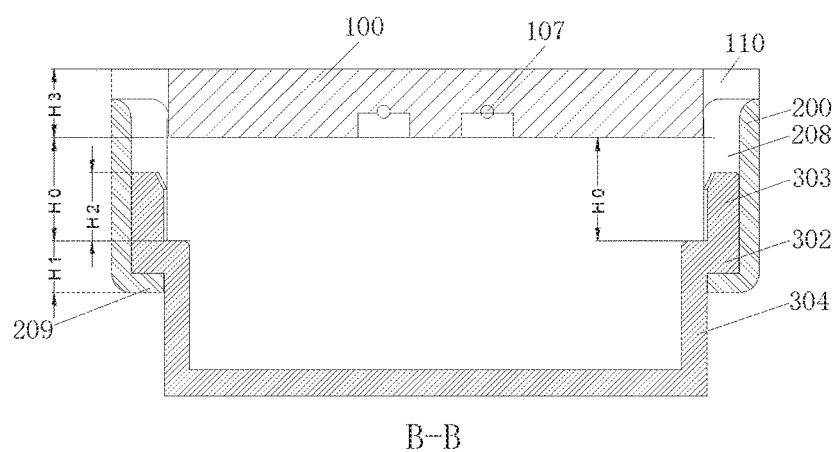
FIG. 19 is a sectional view of the support for household appliance of embodiment IV of the present disclosure along a plane B-B in the FIG. 12.
Figure 20:
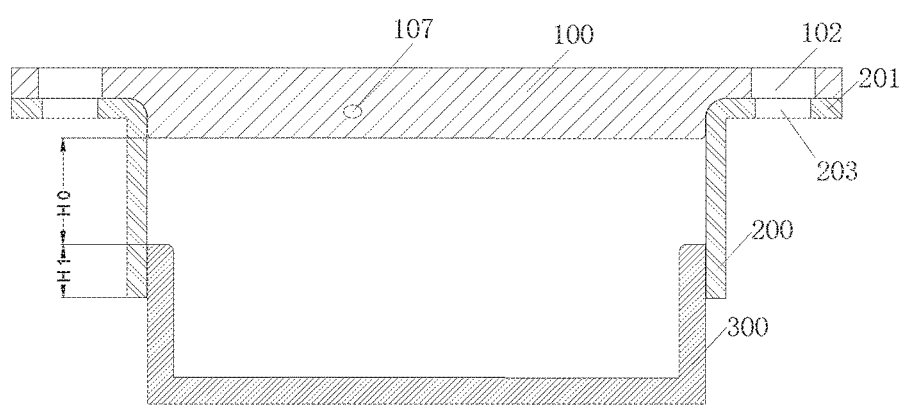
FIG. 20 is a sectional view of the support for household appliance of embodiment IV of the present disclosure along a plane C-C in the FIG. 12.
Figure 21:
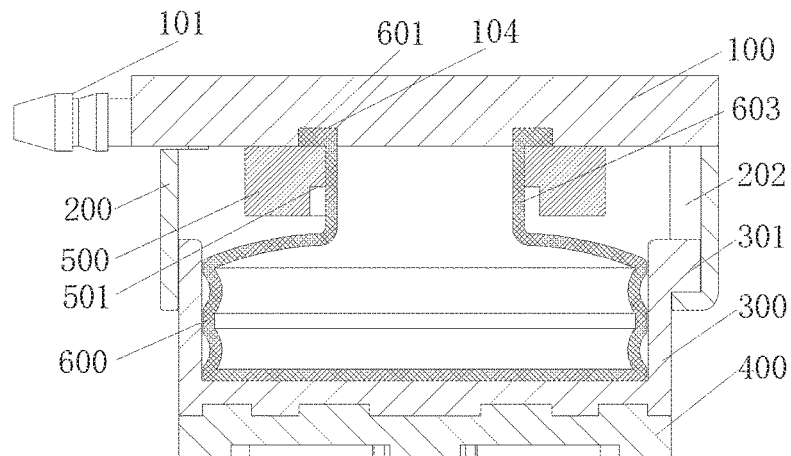
FIG. 21 is a sectional view of an implementation mode of a support for household appliance of embodiment V of the present disclosure.

Referring to FIG. 16, as an implementation mode of the embodiment, a hydraulic plate groove 104 is formed in the bottom face of the hydraulic plate 100, and the opening part 601 of the flexible accommodation body 600 is deformed under pressure of the pressing ring 500 and fills the hydraulic plate groove 104 for sealing. In this mode, sealing can be achieved through fastening the pressing ring 500 and pressing the opening part 601 of the flexible accommodation body 600 to deform and fill the hydraulic plate groove 104, the structure is simple, and the sealing is reliable and effective.

Preferably, a volume enclosed by the hydraulic plate groove 104 and the pressing ring 500 is smaller than the volume of the opening part 601 of the flexible accommodation body 600. Thus, the opening part 601 of the flexible accommodation body 600 can be in tight contact with the hydraulic plate groove 104 to ensure sealing performance.

Further, the pressing ring 500 comprises a radial projecting part 501, the inner diameter of the radial projecting part 501 is smaller than the outer diameter of the opening part 601 of the flexible accommodation body 600, the pressing ring 500 is fixed to the bottom face of the hydraulic plate 100, and the opening part 601 of the flexible accommodation body 600 is deformed under pressure of the radial projecting part 501 and fills the hydraulic plate groove 104 for sealing. The radial projecting part 501 is used for firstly limiting and sticking the opening part 601 of the flexible accommodation body 600 to facilitate locating and mounting, through fastening the pressing ring 500, the opening part 601 is deformed under pressure of the radial projecting part 501, and the opening part 601 enters the hydraulic plate groove 104 for sealing.

Preferably, the inner diameter of the radial projecting part 501 is greater than the outer diameter of the small-diameter part 603 of the flexible accommodation body 600, the radial projecting part 501 of the pressing ring 500 sleeves on the small-diameter part 603 and limits the opening part 601 to the end part of the pressing ring 500, and the opening part 601 of the flexible accommodation body 600 is deformed under pressure of the radial projecting part 501 and fills the hydraulic plate groove 104 for sealing.

Figure 22:
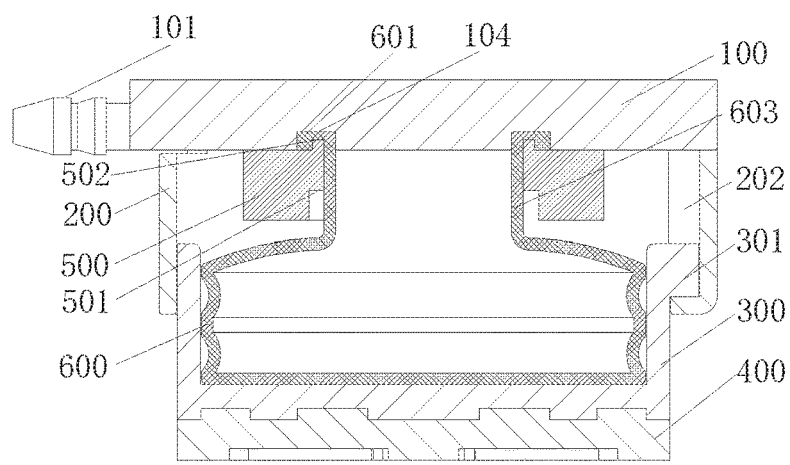
FIG. 22 is a sectional view of another implementation mode of the support for household appliance of embodiment V of the present disclosure.

Referring to FIG. 22, as another implementation mode of the embodiment, the pressing ring 500 comprises an axial projecting part 502 which is arranged at the end part and bulges along an axial direction, the pressing ring 500 is fixed to the bottom face of the hydraulic plate 100, and the opening part 601 of the flexible accommodation body 600 is deformed under pressure of the axial projecting part 502 and fills the hydraulic plate groove 104 for sealing. According to the embodiment, the axial projecting part 502 extends into the hydraulic plate groove 104 when the pressing ring 500 is fixed to the bottom face of the hydraulic plate 100, the axial projecting part 502 further presses the opening part 601 of the flexible accommodation body 600 to be in close contact with the hydraulic plate groove 104, and thus, the sealing performance is enhanced.

Figure 23:
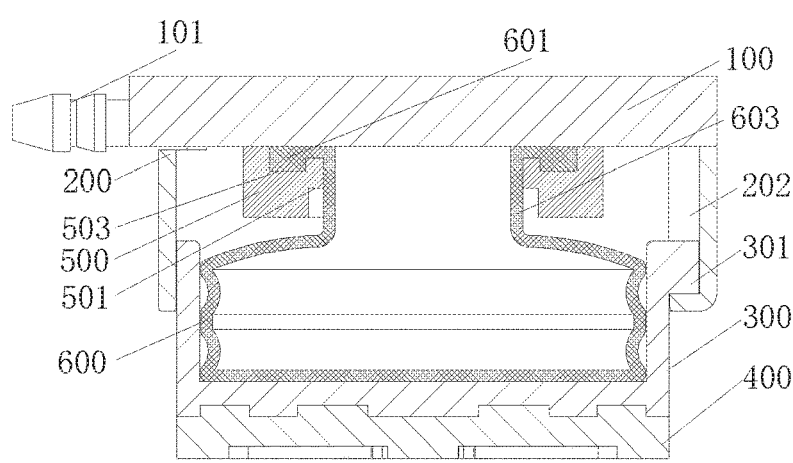
FIG. 23 is a sectional view of another implementation mode of the support for household appliance of embodiment V of the present disclosure.

Referring to FIG. 23, as another implementation mode of the embodiment, the opening part 601 of the flexible accommodation body 600 is fixedly mounted on the bottom face of the hydraulic plate 100 through the pressing ring 500, a pressing ring groove 503 is formed in the upper end of the pressing ring 500, and the opening part is deformed under joint pressure of the pressing ring 500 and the hydraulic plate 100 and fills the pressing ring groove 503 for sealing. Thus, the bottom face of the hydraulic plate 100 can be simply arranged as a planar structure, the bottom face of the hydraulic plate 100 presses the opening part 601 of the flexible accommodation body 600 to deform through fastening the pressing ring 500, and thus, the opening part enters the pressing ring groove 503 for sealing.

Preferably, a volume enclosed by the hydraulic plate 100 and the pressing ring groove 503 is smaller than the volume of the opening part of the flexible accommodation body. Thus, the opening part 601 of the flexible accommodation body 600 is in tight contact with the pressing ring groove 503 to ensure sealing performance.

Figure 24:
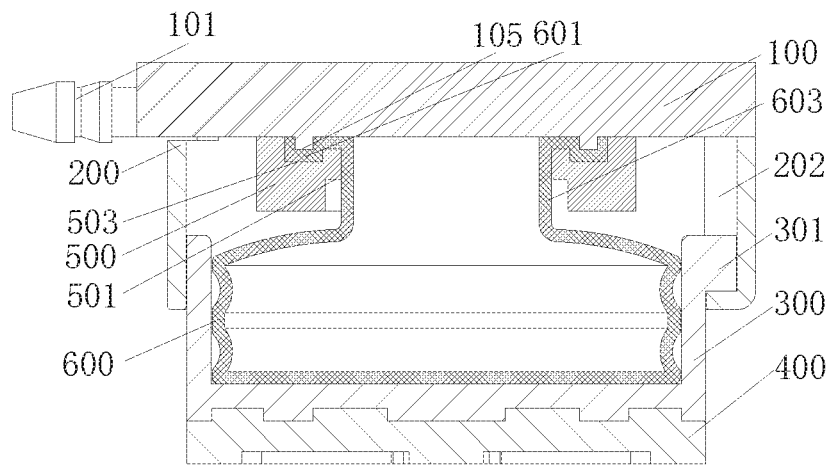
FIG. 24 is a sectional view of another implementation mode of the support for household appliance of embodiment V of the present disclosure.

Referring to FIG. 24, as another implementation mode of the embodiment, a projecting annular bulge 105 is formed on the bottom face of the hydraulic plate 100, the pressing ring 500 is fixed to the bottom face of the hydraulic plate 100, and the opening part 601 of the flexible accommodation body 600 is deformed under pressure of the annular bulge 105 and fills the pressing ring groove 503 for sealing. According to the embodiment, the annular bulge 105 extends into the pressing ring groove 503 when the pressing ring 500 is fixed to the bottom face of the hydraulic plate 100, the annular bulge 105 further presses the opening part 601 of the flexible accommodation body 600 to be in close contact with the pressing ring groove 503, and thus, the sealing performance is enhanced.

Figure 25:
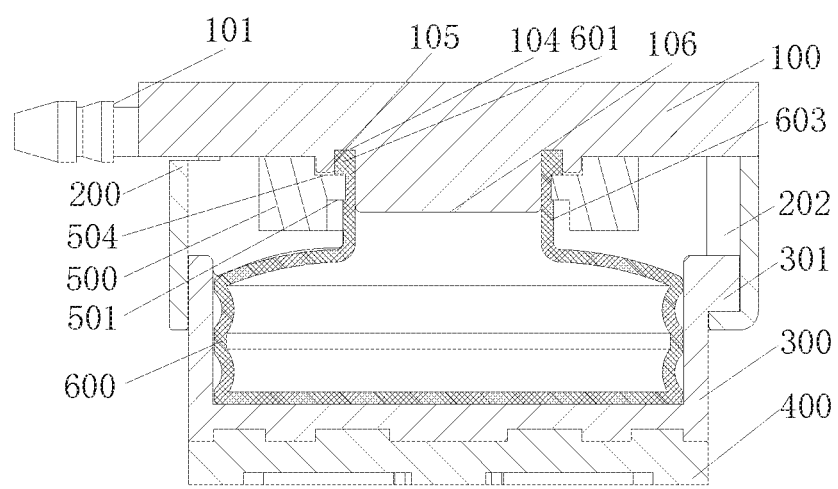
FIG. 25 is a sectional view of another implementation mode of the support for household appliance of embodiment V of the present disclosure.

Referring to FIG. 25, as another implementation mode of the embodiment, an annular groove 504 is formed in the pressing ring 500, the opening part 601 of the flexible accommodation body 600 passes through the pressing ring 500 and is stuck in the annular groove 504, and the hydraulic plate groove 104 corresponding to the annular groove 504 is formed in the bottom face of the hydraulic plate 100. The opening part 601 of the flexible accommodation body 600 is fastened to the hydraulic plate 100 through the pressing ring 500, and the opening part 601 of the flexible accommodation body 600 is deformed and fills the annular groove 504 and the hydraulic plate groove 104 by a fastening force in a vertical direction to form a transverse seal.

The annular bulge 105 which is located at an outer ring of the hydraulic plate groove 104 is formed on the bottom face of the hydraulic plate 100, a central convex column 106 which is located within the circle of the hydraulic plate groove 104 is arranged on the bottom face of the hydraulic plate 100, and the diameter of the central convex column 106 is greater than the outside diameter of the opening part 601 of the flexible accommodation body 600. The annular bulge 105 enters the hydraulic plate groove 104 and presses the opening part 601 of the flexible accommodation body 600 in a transverse direction together with the central convex column 106 to form a vertical seal.

According to the embodiment, the connection between the flexible accommodation body 600 and the hydraulic plate 100 achieves the transverse seal and the vertical seal, and the higher the borne pressure is, the better the press sealing effect is, so that leakage of the hydraulic medium is prevented, and stability of leveling of the support for household appliance is ensured.

Figure 26:
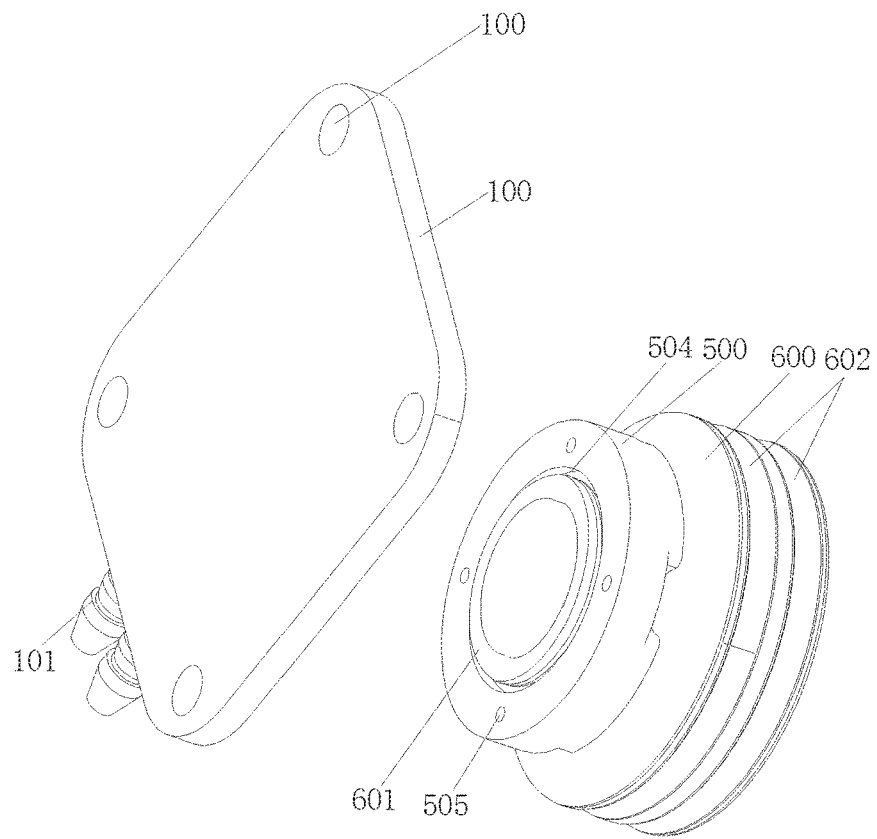
FIG. 26 is a local exploded view of the support for household appliance of embodiment V of the present disclosure.
Figure 27:
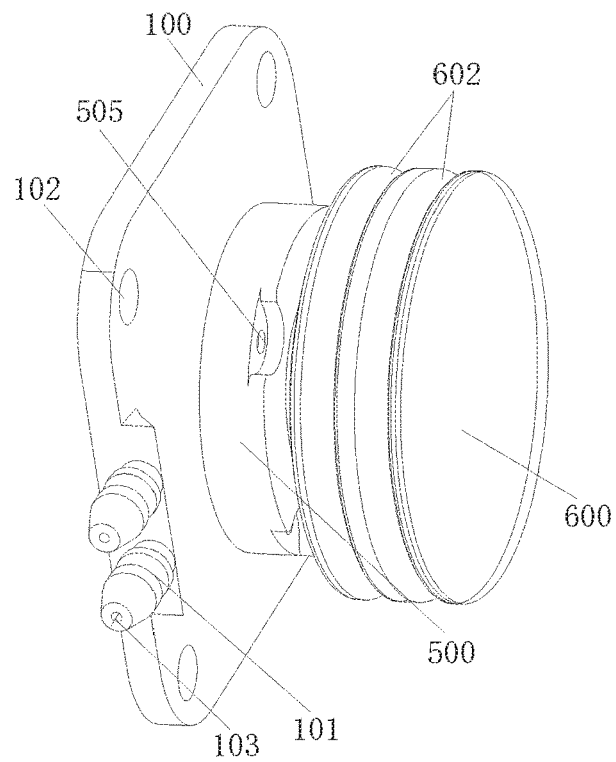
FIG. 27 is a partial assembly drawing of the support for household appliance of embodiment V of the present disclosure.

Referring to FIG. 26 and FIG. 27, the pressing ring 500 is fixed to the hydraulic plate 100 through a fixing device, specifically the pressing ring 500 and the hydraulic plate 100 is fixedly connected through bolts/screws. Pressing ring mounting holes 505 are formed in the pressing ring 500, and the bolts/screws are fastened to the hydraulic plate 100 through the pressing ring mounting holes 505.

Figure 28:
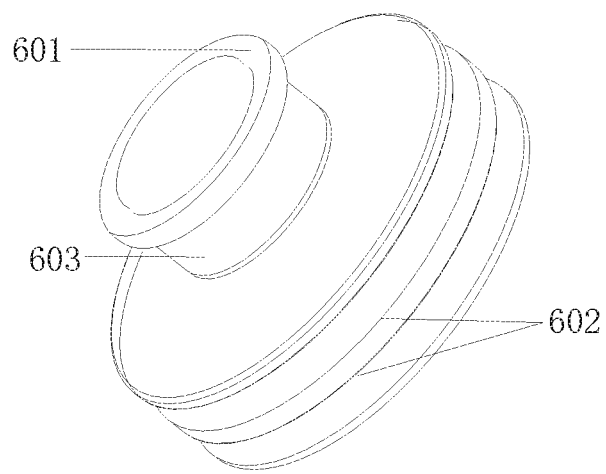
FIG. 28 is a three-dimensional structural schematic diagram of a flexible accommodation body of the support for household appliance of embodiment V of the present disclosure.
Figure 29:
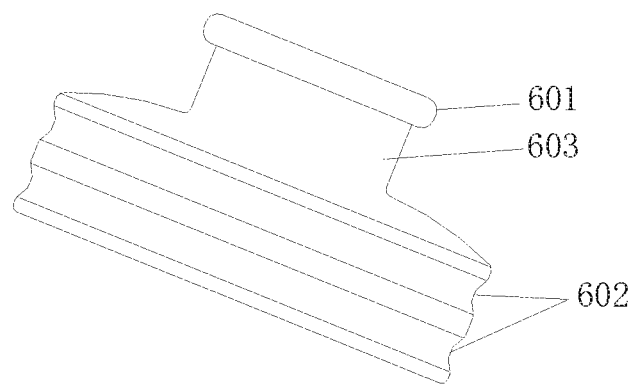
FIG. 29 is another three-dimensional structural schematic diagram of a flexible accommodation body of the support for household appliance of embodiment V of the present disclosure.

According to the embodiment, the flexible accommodation body 600 has a structure shown in FIG. 28 and FIG. 29 and comprises an accommodating body 602. The accommodating body 602 is of a soft capsular structure and has a telescopic corrugation structure, and the corrugation structure is arranged in the regulating support 300 and extends and retracts along with the flowing of the liquid medium to drive the regulating support 300 to axially move in the sheath 200 for leveling.

Referring to FIG. 28, the opening part 601 of the flexible accommodation body 600 is of an O ring shape.

Referring to FIG. 29, the opening part 601 of the flexible accommodation body 600 is of a rectangular shape, and of course, rectangular sides can be subjected to round-off treatment, so that the volume of the opening is effectively increased, and the sealing effect is effectively improved.

Embodiment VI

A support for household appliance comprises:

a hydraulic plate 100, which is internally provided with a liquid flow passage 107;

a sheath 200, which is fixedly connected with the hydraulic plate 100;

a regulating support 300, which is arranged in the sheath 200 and is axially movable relative to the sheath 200;

an accommodation chamber, which is formed by the hydraulic plate 100, the sheath 200 and the regulating support 300; and a flexible accommodation body 600, which accommodates a liquid medium and is arranged in the accommodation chamber;

the flexible accommodation body 600 extends and retracts to drive the regulating support 300 to axially move in the sheath 200 for leveling under the action of pressure;

further comprises a rubber gasket 400 which is fixed to the bottom of the regulating support 300, the bottom of the rubber gasket 400 has designed patterns 401, thus, the friction force to the ground is increased, and the stability is enhanced.

Embodiment VII

The embodiment also provides a household appliance with the support for household appliance, provided by any one of the above-mentioned embodiments. The household appliance comprises a casing, wherein a plurality of household-appliance-used supports are mounted at the bottom of the casing, and a hydraulic medium being provided in the household-appliance-used supports 1000 circulates among the household-appliance-used supports for leveling.

According to the embodiment of the present disclosure, taking a washing machine for example, a principle and a method for automatic leveling of the washing machine by using the support for household appliance, provided by the present disclosure, are elaborated. After the washing machine is mounted, different household-appliance-used supports are different in horizontal height due to an out-of-flat ground surface, and the household-appliance-used supports located at pits of the ground surface are low in position. Thus, the household-appliance-used supports at high positions firstly bear the weight of the washing machine and bear a large gravity force, and the household-appliance-used supports at low positions bear a small gravity force due to failure support.

Regulating supports of the household-appliance-used supports at high positions move up under high pressure, heights of the entire supports are reduced, thus, volumes of hollow chambers of flexible accommodation bodies full of the hydraulic medium are compressed and reduced, the hydraulic medium is forced to enter throttling holes or valve holes and enter the household-appliance-used supports at low positions through high-pressure pipes, thus, the hydraulic medium in flexible accommodation bodies of the household-appliance-used supports at low positions becomes more and more, and the flexible accommodation bodies are expanded to promote the stretching of the regulating supports.

When the supports at high positions and the supports at low positions are the same in hydraulic pressure, the hydraulic medium does not flow in the high-pressure pipes any more, relative positions of the regulating supports and a bottom plate of the washing machine do not change any more, and the automatic regulating of the washing machine is completed.

During the washing or spin-drying of the washing machine, the hydraulic medium can also slowly flow for self-leveling, so that vibration noises of the washing machine are greatly lowered.

In addition, the support for household appliance, provided by each of the above-mentioned embodiments of the present disclosure, can also be applied to household appliances such as electric refrigerators, coolers and air-conditioner indoor units, besides washing machines.

It is necessary to note that each of the above-mentioned embodiments of the present disclosure can be implemented independently and can also be implemented by combining a plurality of embodiments.

The above-mentioned embodiments are only preferred embodiments of the present disclosure, but not intended to limit the present disclosure in any form. Although the present disclosure has been described in terms of preferred embodiments, it is not intended to be limited to these disclosed embodiments. Equivalent embodiments, of which some changes or modifications are equivalent changes, may be made by any skilled in the art by using the above-mentioned technical contents without departing from the technical scheme scope of the present disclosure. However, all simple amendments, equivalent changes and modifications made to the above embodiments according to the technical essence of the present disclosure without departing from the technical scheme scope of the present disclosure all still fall within the protection scope of the present disclosure.

The invention claimed is:

1. A support for a household appliance, comprising:
a hydraulic plate;
a sheath being fixedly connected with the hydraulic plate;
a regulating support being arranged in the sheath and being axially movable relative to the sheath;
an accommodation chamber being formed by the hydraulic plate, the sheath and the regulating support; and
a flexible accommodation body accommodating a liquid medium and being arranged in the accommodation chamber;
the flexible accommodation body extending and retracting to drive the regulating support to axially move in the sheath for leveling under action of pressure;
wherein a fixing member for sealingly mounting the flexible accommodation body to the hydraulic plate and a protecting member for protecting the flexible accommodation body are provided, wherein the fixing member is embedded in the protecting member, and one end of the protecting member is provided with a protecting curved surface and the protecting curved surface is matched with an outer surface of the flexible accommodation body to prevent the flexible accommodation body from being damaged by pressure;
another end of the protecting member is provided with an insertion groove, and the fixing member is embedded in the insertion groove of the protecting member.

2. The support for the household appliance according to claim 1, wherein at least one of the fixing member and the protecting member is provided with a limiting mechanism for limiting a circumferential rotation of the protecting member relative to the fixing member.

3. The support for the household appliance according to claim 2, wherein a limiting protrusion is provided on an inner wall of the insertion groove of the protecting member, and a limiting recess cooperating with the limiting protrusion is provided on the fixing member.

4. The support for the household appliance according to claim 3, wherein the flexible accommodation body comprises an opening part and a retractable accommodating body; the opening part is sealingly mounted to the hydraulic plate by the fixing member;
the protecting member is arranged between the accommodating body and the fixing member; and the protecting curved surface cooperates with the accommodating body.

5. The support for the household appliance according to claim 2, wherein the flexible accommodation body comprises an opening part and a retractable accommodating body; the opening part is sealingly mounted to the hydraulic plate by the fixing member;
the protecting member is arranged between the accommodating body and the fixing member; and the protecting curved surface cooperates with the accommodating body.

6. The support for the household appliance according to claim 1, wherein the flexible accommodation body comprises an opening part and a retractable accommodating body; the opening part is sealingly mounted to the hydraulic plate by the fixing member;
the protecting member is arranged between the accommodation body and the fixing member; and the protecting curved surface cooperates with the accommodation body.

7. The support for the household appliance according to claim 6, wherein the fixing member is a pressing ring and the pressing ring includes an annular body;
an inside of the annular body has a pressing ring opening;
the opening part of the flexible accommodation body passes through the pressing ring opening and is sealingly mounted to the hydraulic plate by the annular body;
the protecting member comprises a protecting ring, and a protecting ring opening for allowing the opening part to pass through is provided inside the protecting ring;
the insertion groove for allowing the pressing ring to be inserted is provided in one end of the protecting ring, proximate to the pressing ring, and the protecting curved surface is provided on an other end of the protecting ring, in touch with the flexible accommodation body.

8. The support for the household appliance according to claim 7, wherein an internal wall of the insertion groove of the protecting ring is provided with at least one limiting protrusion, and an outer peripheral wall of the pressing ring is provided with a limiting recess matched with a limiting protrusion.

9. The support for the household appliance according to claim 8, wherein the limiting protrusion has an arc-shaped limiting outer convex surface, and the limiting recess has an arc-shaped limiting inner concave surface, and the limiting outer convex surface and the limiting inner concave surface cooperate with each other.

10. The support for the household appliance according to claim 9, wherein the flexible accommodation body comprises a small-diameter part communicating with the accommodating body; and an inner diameter of the small-diameter part is smaller than an inner diameter of the accommodating body;

an end part of the small-diameter part is flanged to form the opening part, the fixing member sleeves on the small-diameter part to sealingly mount the opening part to the hydraulic plate;

the protecting member sleeves on the small-diameter part and is located between the accommodating body and the fixing member.

11. The support for the household appliance according to claim 8, wherein a plurality of limiting protrusions are provided, which are respectively distributed along a circumferential direction of the internal wall of the insertion groove, and a plurality of limiting recesses are provided, which are distributed on the outer peripheral wall of the pressing ring.

12. The support for the household appliance according to claim 8, wherein the flexible accommodation body comprises a small-diameter part communicating with the accommodating body; and an inner diameter of the small-diameter part is smaller than an inner diameter of the accommodating body;

an end part of the small-diameter part is flanged to form the opening part, the fixing member sleeves on the small-diameter part to sealingly mount the opening part to the hydraulic plate;

the protecting member sleeves on the small-diameter part and is located between the accommodating body and the fixing member.

13. The support for the household appliance according to claim 7, wherein the flexible accommodation body comprises a small-diameter part communicating with the accommodating body; and an inner diameter of the small-diameter part is smaller than an inner diameter of the accommodating body;

an end part of the small-diameter part is flanged to form the opening part, the fixing member sleeves on the small-diameter part to sealingly mount the opening part to the hydraulic plate;

the protecting member sleeves on the small-diameter part and is located between the accommodating body and the fixing member.

14. The support for the household appliance according to claim 6, wherein the flexible accommodation body comprises a small-diameter part communicating with the accommodating body; and an inner diameter of the small-diameter part is smaller than an inner diameter of the accommodating body;

an end part of the small-diameter part is flanged to form the opening part, the fixing member sleeves on the small-diameter part to sealingly mount the opening part to the hydraulic plate;

the protecting member sleeves on the small-diameter part and is located between the accommodation body and the fixing member.

15. A household appliance with the bottom foot for household appliance according to claim 1.

* * * * *